US012724724B2

(12) United States Patent
Syrivelis et al.

(10) Patent No.: US 12,724,724 B2
(45) Date of Patent: Sep. 1, 2026

(54) DEVICES, METHODS, AND SYSTEMS FOR DISAGGREGATED MEMORY RESOURCES IN A COMPUTING ENVIRONMENT

(71) Applicant: MELLANOX TECHNOLOGIES, LTD., Yokneam (IL)

(72) Inventors: Dimitrios Syrivelis, Volos (GR); Paraskevas Bakopoulos, Ilion (GR); Ioannis (Giannis) Patronas, Pireas (GR); Elad Mentovich, Tel Aviv (IL); James Stephen Fields, Jr., Santa Fe, NM (US); Haggai Eran, Yokneam Ilit (IL); Liran Liss, Atzmon-Segev (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/747,156

(22) Filed: Jun. 18, 2024

(65) Prior Publication Data

US 2024/0338327 A1 Oct. 10, 2024

Related U.S. Application Data

(62) Division of application No. 17/673,105, filed on Feb. 16, 2022, now Pat. No. 12,045,178.

(30) Foreign Application Priority Data

Feb. 10, 2022 (GR) .............................. 20220100128

(51) Int. Cl.
*G06F 13/16* (2006.01)

(52) U.S. Cl.
CPC ................................ *G06F 13/1642* (2013.01)

(58) Field of Classification Search
CPC .................................................. G06F 13/1642
USPC ........................................................ 710/112
See application file for complete search history.

(56) References Cited

U.S. PATENT DOCUMENTS

| | | | | |
|---|---|---|---|---|
| 5,003,465 A | | 3/1991 | Chisholm et al. | |
| 5,390,302 A | * | 2/1995 | Johnson | G06F 9/466 709/230 |
| 5,428,782 A | * | 6/1995 | White | G06F 9/54 719/330 |

(Continued)

FOREIGN PATENT DOCUMENTS

| | | |
|---|---|---|
| CN | 111061749 | 4/2020 |

OTHER PUBLICATIONS

Extended Search Report for European Patent Application No. 23156156.4, dated Jun. 5, 2023, 11 pages.

(Continued)

*Primary Examiner* — Paul R. Myers
(74) *Attorney, Agent, or Firm* — Sheridan Ross P.C.

(57) ABSTRACT

A system comprises a first processing block configured to receive, from a first local resource, a formatted transaction in a format that is not recognizable by a remote endpoint; determine a first transaction category, from among a plurality of transaction categories, of the formatted transaction based on content of the formatted transaction; perform one or operations on the formatted transaction based on the first transaction category to form a reformatted transaction in a format that is recognizable by the remote endpoint; and place the reformatted transaction in a queue for transmission to the remote endpoint.

20 Claims, 19 Drawing Sheets

(56) References Cited

U.S. PATENT DOCUMENTS 5,535,375 A 7/1996 Eshel et al.
5,710,892 A 1/1998 Goodnow et al.
5,737,546 A 4/1998 Fenwick et al.
5,764,934 A 6/1998 Fisch et al.
5,944,805 A 8/1999 Ricks et al.
5,953,511 A 9/1999 Sescila, III et al.
6,047,120 A 4/2000 Bell
6,058,413 A 5/2000 Flores et al.
6,567,883 B1 5/2003 Dahlen et al.
6,862,648 B2 3/2005 Yatziv
6,996,659 B2 2/2006 Lupien et al.
7,028,132 B2 4/2006 Riley
7,096,308 B2 8/2006 Main et al.
7,096,310 B2 8/2006 Norden
7,106,803 B1 * 9/2006 Hsu .......................... H04L 25/08 375/279
7,231,486 B2 6/2007 Ajanovic et al.
7,240,141 B2 7/2007 Ning et al.
7,644,221 B1 1/2010 Chan et al.
7,653,775 B2 1/2010 Pujol et al.
7,911,346 B1 3/2011 Claudatos et al.
8,392,288 B1 3/2013 Miller
8,631,184 B2 1/2014 Mangano et al.
8,942,300 B1 * 1/2015 Castro Scorsi ......... G06F 13/28 702/108
10,417,146 B1 9/2019 Kotha et al.
10,686,958 B2 6/2020 Miyaguchi
12,045,178 B2 7/2024 Syrivelis et al.
2001/0044911 A1 * 11/2001 Iijima ...................... G07G 1/14 714/E11.13
2002/0012344 A1 * 1/2002 Johnson ............... H04Q 3/5455 370/389
2002/0071485 A1 * 6/2002 Caglar ................... H04N 19/50 375/E7.091
2002/0080719 A1 * 6/2002 Parkvall ................ H04L 1/0001 370/252
2002/0144039 A1 10/2002 Lackey et al.
2003/0014593 A1 1/2003 Arimilli et al.
2003/0028643 A1 * 2/2003 Jabri ...................... H04N 19/40 709/226
2003/0046356 A1 3/2003 Alvarez et al.
2003/0061424 A1 3/2003 Leete et al.
2003/0079075 A1 4/2003 Asseline
2003/0101311 A1 * 5/2003 Chang ................... G06F 13/426 710/310
2003/0154359 A1 8/2003 Henry et al.
2003/0182305 A1 9/2003 Balva et al.
2003/0200360 A1 * 10/2003 Saito ....................... H04L 49/90 710/5
2004/0109473 A1 6/2004 Lebizay et al.
2004/0225707 A1 11/2004 Chong et al.
2004/0225787 A1 11/2004 Ma et al.
2004/0246931 A1 * 12/2004 Thubert ................ H04W 48/08 370/338
2005/0005039 A1 * 1/2005 Saito ..................... H04L 49/901 710/52
2005/0068577 A1 * 3/2005 Birkhoelzer ........... G16H 30/20 358/1.15
2006/0007466 A1 * 1/2006 Ben-Yehuda ......... G06F 40/154 358/1.13
2006/0015618 A1 * 1/2006 Freimuth ................ H04L 49/90 711/E12.057
2006/0106988 A1 5/2006 Khawand et al.
2006/0129676 A1 * 6/2006 Modi ...................... H04L 61/25 709/227
2006/0190655 A1 8/2006 Kautzman et al.
2006/0206432 A1 * 9/2006 Russell ............... H04L 63/0209 705/57
2006/0242333 A1 10/2006 Johnsen et al.
2006/0282829 A1 12/2006 Mcllvaine et al.
2007/0011209 A1 1/2007 Wietlisbach et al.
2007/0130015 A1 6/2007 Starr et al.
2007/0189178 A1 * 8/2007 Ottamalika ............. H04L 12/66 370/252
2007/0214065 A1 9/2007 Kahlon et al.
2008/0059441 A1 3/2008 Gaug et al.
2008/0304515 A1 * 12/2008 Maeda .................. H04L 69/165 370/466
2009/0176498 A1 * 7/2009 Colon ..................... H04L 67/56 455/445
2010/0011146 A1 * 1/2010 Saghi .................. G06F 13/4282 710/314
2010/0037237 A1 * 2/2010 Reinart ................... G06F 9/541 719/312
2010/0125547 A1 5/2010 Barrett et al.
2010/0257329 A1 10/2010 Khailany et al.
2010/0318713 A1 12/2010 Deshpande
2011/0246899 A1 * 10/2011 Kwon ..................... H04L 43/18 715/736
2011/0282739 A1 11/2011 Mashinsky et al.
2012/0110234 A1 5/2012 Gruber
2013/0054519 A1 * 2/2013 Ohno .................. G06F 16/1794 707/610
2013/0144566 A1 * 6/2013 De Biswas ............. G06F 30/00 703/1
2013/0173719 A1 * 7/2013 Ahmed ................... G06F 9/541 709/206
2013/0177028 A1 7/2013 Lebizay et al.
2013/0179546 A1 7/2013 Seol et al.
2014/0040208 A1 2/2014 Graefe et al.
2014/0281724 A1 9/2014 Ki et al.
2015/0156056 A1 6/2015 Lowery
2016/0232701 A1 * 8/2016 Drozdyuk ............... G06T 17/00
2016/0342549 A1 11/2016 Hathorn et al.
2017/0351570 A1 * 12/2017 Laity .................. G11C 29/4401
2018/0131593 A1 * 5/2018 Jain .......................... H04L 47/34
2018/0143879 A1 5/2018 Dornemann
2019/0132424 A1 5/2019 Jeong et al.
2019/0220423 A1 7/2019 Makwana et al.
2020/0310968 A1 * 10/2020 Kim .................... G06F 12/0246
2022/0309011 A1 9/2022 Nagarajan et al.
2022/0360644 A1 * 11/2022 Ihlar ................... H04L 12/4633

OTHER PUBLICATIONS

Official Action for U.S. Appl. No. 17/673,105, dated Jun. 14, 2023 6 pages Restriction Requirement.
Official Action for U.S. Appl. No. 17/673,105, dated Aug. 23, 2023 14 pages.
Official Action for U.S. Appli. No. 17/673,105, dated Dec. 5, 2023 13 pages.
Notice of Allowance for U.S. Appl. No. 17/673,105, dated Mar. 20, 2024 5 pages.
Official Action with Machine Translation for China Patent Application No. 202310099566.3, dated Jun. 26, 2026, 14 pages.
Official Action for European Patent Application No. 23156156.4, dated Jul. 8, 2026, 7 pages.

* cited by examiner

DPU

PCIe Switch 116

Processor Cores Subsystem 104

Processing Complex 120

Acceleration Engine(s) 124

Network Interface(s) 128

NIC Subsystem 108

Network Interface(s) 128

DPA 132

Programmable Core(s) 136

Memory 140

Vector Instr. List 144

Circuitry 148

Network 152

DDR 156

SSD(s) 160

GPU(s) 164

Fabric Manager – Control plane
332
DPU 1
DPU Resources
IBCore
Client Endpoint Logic
Server Endpoint Logic
X-BUS Host Attachment
Local resource(s) 320a
300a
304a
308a
316a
324a
18
Network switch(es)
312
DPU 2
DPU Resources
IBCore
Client Endpoint Logic
Server Endpoint Logic
X-BUS Host Attachment
Local resource(s) 320b
300b
304b
308b
316b
324b

DEVICES, METHODS, AND SYSTEMS FOR DISAGGREGATED MEMORY RESOURCES IN A COMPUTING ENVIRONMENT

CROSS REFERENCE TO RELATED APPLICATIONS

This application is a divisional of U.S. patent application Ser. No. 17/673,105, filed Feb. 16, 2022, which claims priority under 35 U.S.C. § 119 to Greek Application No. 20220100128 filed on Feb. 10, 2022, the disclosure of which is hereby incorporated by reference, in its entirety, for all that it teaches and for all purposes.

FIELD

Embodiments of the present disclosure relate generally to management of disaggregated computing resources, for example, in a datacenter environment.

BACKGROUND

Datacenters are typically comprised of many servers and network switches for processing and routing network traffic. The processing resources (e.g., central processing units (CPUs)) of the servers and/or network switches may utilize local memory resources, which can lead to inefficient memory usage, for example, even when the processing resources are at full capacity.

BRIEF SUMMARY

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scope of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

It is with respect to the above issues and other problems that the embodiments presented herein were contemplated.

In an illustrative embodiment, a system comprises a first processing block configured to: receive, from a first local resource, a formatted transaction in a format that is not recognizable by a remote endpoint; determine a first transaction category, from among a plurality of transaction categories, of the formatted transaction based on content of the formatted transaction; perform one or operations on the formatted transaction based on the first transaction category to form a reformatted transaction in a format that is recognizable by the remote endpoint; and place the reformatted transaction in a queue for transmission to the remote endpoint.

In another illustrative embodiment, a system comprises a first endpoint comprising: first client endpoint logic coupled to a first processing resource, the first client endpoint logic being configured to format first transactions received from the first processing resource for sending to a second endpoint, and to receive first transaction responses from the second endpoint indicating execution of the first transactions at the second endpoint; and first server endpoint logic coupled to a first memory resource, the first server endpoint logic being configured to direct second transactions received from the second endpoint to the first memory resource for execution, and to, upon execution of the second transactions, format second transaction responses from the first memory resource for sending to the second endpoint.

In another illustrative embodiment, a method comprises formatting, by first client endpoint logic of a network adapter coupled to a first processing resource at a first endpoint, first transactions received from the first processing resource for sending to a second endpoint; receiving, by the first client endpoint logic, first transaction responses from the second endpoint indicating execution of the first transactions at the second endpoint; directing, by first server endpoint logic of the network adapter coupled to a first memory resource, second transactions received from the second endpoint to the first memory resource for execution; and formatting, by the first server endpoint logic upon execution of the second transactions, second transaction responses from the first memory resource for sending to the second endpoint.

In another illustrative embodiment, a system comprises a first processing block configured to: receive, from a remote endpoint, a mastered transaction in a format that is recognizable by a local memory resource; and perform one or more operations that direct the mastered transaction to the local memory resource; and a second processing block configured to: determine whether the mastered transaction that has been directed to the local memory resource should be reissued; send, when the mastered transaction should be reissued, an indication to the first processing block that causes the mastered transaction to be reissued to the local memory resource; and generate, when the mastered transaction should not be reissued, an indication that the mastered transaction has been performed at the local memory resource, the indication that the mastered transaction has been performed comprising a transaction response that is sent to the remote endpoint.

Additional features and advantages are described herein and will be apparent from the following Description and the figures.

BRIEF DESCRIPTION OF THE DRAWINGS

The present disclosure is described in conjunction with the appended figures, which are not necessarily drawn to scale.

DETAILED DESCRIPTION

Figure 1:
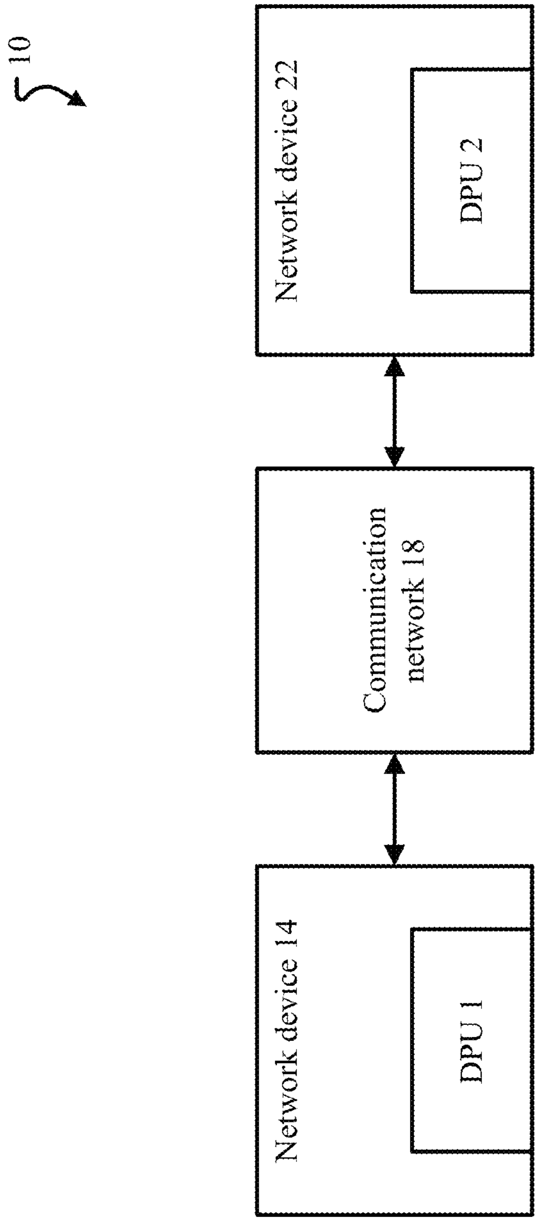
FIG. 1 illustrates a networking system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Disaggregation of computing resources that are attached to a system interconnect has the potential to revolutionize the way datacenters are built. Instead of having to decide the mix of server resources at deployment time, disaggregation enables pools of resources to be organized (e.g., in racks) and can be flexibly combined at runtime to form a computing platform. In addition, such resource pools can be independently refreshed given their standard network attachment. Organizing datacenter server resources in independent pools and dynamically assigning them to workloads at runtime has the potential to improve performance. Disaggregation may be utilized in some datacenter storage solutions: disk arrays are stacked in dedicated racks and use the data network to attach to any server at runtime, which generates significant network east-west traffic; GPUs may be disaggregated, for example, at rack-level scale using a custom fabric (e.g., NVLink); and/or NICs and other peripherals may be disaggregated at the chassis-level using, for example, a PCI-e switch. On the other hand, main system memory or local memory of datacenter servers and/or switches, which is typically backed up by DRAM is normally not disaggregated, which may lead to inefficient memory usage. For example, up to ⅓ of memory resources get stranded in servers with fully utilized CPUs. Memory disaggregation is an important feature for datacenters that poses difficult challenges to all levels of the datacenter stack. Pursuing different fabrics for each resource type encounters scaling problems, both because of practical deployment concerns (cabling is already an issue) and system complexity.

To combat and/or solve the above stated problems and other problems, inventive concepts propose an approach that builds a fabric on top of a suitable transport protocol (e.g., InfiniBand) that can flexibly and concurrently use different host attachment technologies to tunnel system interconnect traffic between CPUs, memory, and peripherals that belong to different servers over a datacenter network or other network. Stated another way, inventive concepts enable servers within a datacenter to use memory resources beyond their usual local memory resources.

In general, disaggregated resources communicate with greater latency and less bandwidth than if the same resources were integrated on the same system on chip (SoC), which may introduce latencies well beyond the time that a signal needs to cover the physical distance between remote resources (e.g., at the speed of light). Thus, a resource disaggregation fabric according to inventive concepts is designed to achieve minimum latency and jitter. In addition, inventive concepts propose to use a network transport that provides end-to-end quality of service and performance guarantees while enabling intermediate network switches to serve such traffic. In one non-limiting example, the above-described properties may be achieved with inventive concepts by using InfiniBand (IB) transport and wire protocols. InfiniBand, which underpins state-of-the-art RDMA operations, comprises an all-hardware network transport used to connect supercomputers. InfiniBand has the potential to serve disaggregation traffic in that IB transport provides a reliable pipeline that also maintains in order delivery and, when combined with InfiniBand wire protocol and IB switches, end-to-end QoS and latency guarantees are provided even when the traffic needs to cross several switching layers (e.g., network switches). IB round-trip time (RTT) latency with one switching layer is in the area of 1 us, which is an acceptable latency given a comparison to a dedicated circuit network to perform the same task. In addition, IB NICs typically support the highest transceiver speeds in the industry. One current host attachment approach of IB NICs follows the traditional Direct Memory Access (DMA) engine-assisted integration with an OS-network stack (though many tasks have been offloaded in hardware).

By design, DMA engines are not typically appropriate for hauling master-subordinate types of traffic. The term "traffic" refers to interconnect transaction flows and the master-subordinate terminology used herein indicates which endpoint initiated the transaction (i.e., a master) and which endpoint serves and responds to a transaction (i.e., a subordinate). Throughout the instant description, "mastered transactions" are transactions initiated by a master endpoint that get served by a subordinate endpoint. A mastered transaction may be outstanding (or in flight and not yet completed by the subordinate endpoint) or completed (i.e., completed at the subordinate endpoint). The main reason is that DMA engines expect to receive information first (typically from software device drivers) to carry out a transfer, and all these "logistics" make sense if the amount of data (data burst) that gets transferred in one push is of adequate size (e.g., 1500 bytes or more). In system interconnect architectures, direct mastering of load and store operations take place with fixed sizes such as 64 bytes or 128 bytes. Programming a DMA engine to carry out such data transfers is inefficient and exhibits poor performance. Given that artificial intelligence (AI) workloads operate with very frequent exchange of small messages (e.g., all-reduce operations of GPUs), the DMA transfer mechanism is inefficient for scenarios of data-exchange even within server boundaries, i.e., between a CPU and co-located accelerators. Host attachment technologies are also leveraging ultra-fast chip-to-chip transfer serDES to integrate peripherals like a DPU, a NIC, and/or the like. Such host attachment technologies may be used to bypass DMA engines. Example host attachment technologies include compute express link (CXL) as part of PCI-5.0 spec, NVLink (used for GPUs), cache coherent interconnect for accelerators (CCIX) used for ARM processors, and OpenCAPI (open coherent accelerator processor interface). These host attachment technologies are also cache-coherent at the hardware level so that no software intervention is required when interacting with resources that use the cache.

Inventive concepts propose a generic stack host attachment approach (e.g., for IB) that can flexibly leverage currently available and/or future host attachment technologies in the context of an offloading engine (e.g., a data processing unit (DPU), which ultimately enables remote mastering of system interconnect transactions to remote resources as if the remote resources were locally attached. A hardware datapath approach according to inventive concepts maybe software-defined to enable dynamic configurations that bridge suitable host attachment protocols over IB.

Inventive concepts provide disaggregation functionality that is integrated with existing DPU/IB NIC products and that leverages IB data network, which may also be concurrently used by other traffic, without the need for dedicated network equipment and cabling requirements to accomplish such disaggregation. A deployment according to inventive concepts enables centralized control of link establishment between remote resources, which can be brought up and torn down at runtime. This allows a performance conscious reservation of the data network.

Inventive concepts relate to at least the following: 1) a software-defined hardware datapath that accepts configuration to prepare transactions for remote mastering over IB and is attached at the master endpoint of a host (also referred to herein as client endpoint logic); 2) a software-defined hardware datapath that can be configured to locally issue transaction requests to attached subordinate resources, where such transaction requests arrive over IB from remote clients (also referred to herein as server endpoint logic); 3) an out-of-band orchestration fabric controller that can be assumed by IB subnet manager running on network switches, or on DPU isolated CPUs, or on both; and 4) a host attachment protocol-agnostic design so that the same generic datapath can be used to haul traffic from different interconnect technologies to remote hosts. These and other example embodiments according to inventive concepts are discussed in more detail herein.

FIG. 1 illustrates a system 10 according to at least one example embodiment. The system 10 includes a network device 14, a communication network 18, and a network device 22. The network device 14 may include a DPU 1 while the network device 22 may include a DPU 2. Additionally or alternatively, the system 100 and/or the network devices 14 and/or 22 may include a network switch (e.g., an Ethernet switch), a collection of network switches, and/or any other suitable device used to process data and/or to control the flow of data for devices connected to communication network 18. Each network device 14 and 22 may be connected, over the communication network 18, to one or more unillustrated client devices, such as a Personal Computer (PC), a laptop, a tablet, a smartphone, an external server, a collection of external servers, and/or the like. In one specific, but non-limiting example, the system 100 corresponds to a datacenter and the network devices 14 and 22 include racks with one or more servers. Servers belonging to each network device 14 and 22 may be co-located (e.g., on a same server rack). Meanwhile, the network device 14 and the network device 22 may be remotely located from one another in the datacenter (e.g., the network devices 14 and 22 are associated with different server racks).

Examples of the communication network 108 include an Internet Protocol (IP) network, an Ethernet network, an InfiniBand network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 enables communication between the DPUs 1 and 2 using InfiniBand technology.

Figure 2:
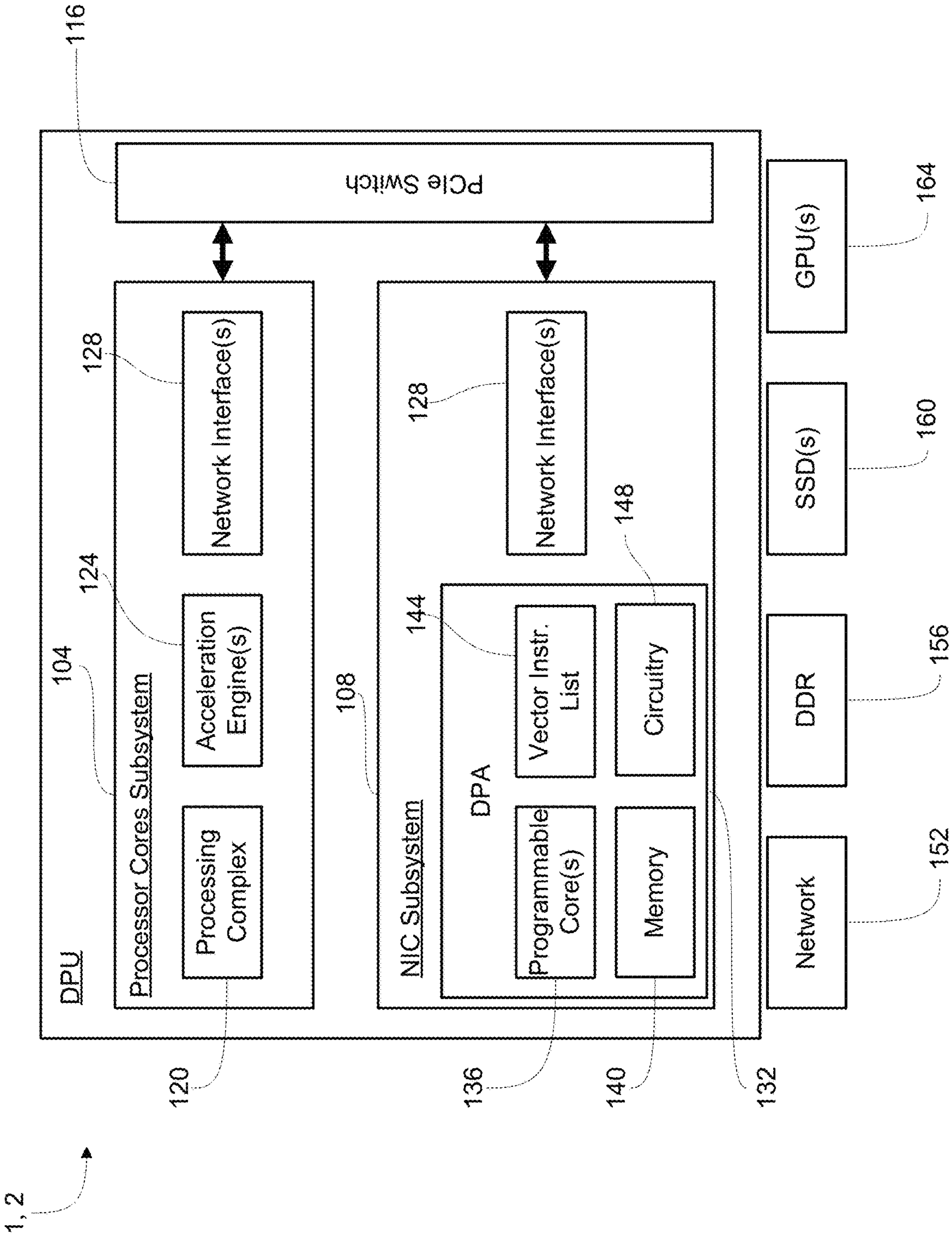
FIG. 2 illustrates an example structure for the DPUs in FIG. 1 according to at least one example embodiment.

The network device 14 and/or the network device 22 may include storage devices and/or processing circuitry for carrying out computing tasks, for example, tasks associated with controlling the flow of data within each network device 14 and 22 and/or over the communication network 108. For example, the network device 14 includes DPU 1 while network device 22 includes DPU 2. Such DPUs 1 and 2 may comprise software, hardware, or a combination thereof. In one non-limiting example, the DPUs 1 and 2 accelerate certain tasks offloaded from other processing resources of a respective network device 14 and 22. As discussed in more detail below with reference to various figures, the DPUs 1 and 2 may implement software-defined hardware datapaths for remote mastering transactions. A DPU 1 and/or 2 may comprise a processor corresponding to one or many computer processing devices. Non-limiting examples of a processor include a microprocessor, an IC chip, a Graphics Processing Unit ("GPU"), a CPU, an ASIC, FPGA, any suitable type of Integrated Circuit ("IC") chip, a collection of IC chips, and/or the like. In some embodiments, a DPU may be provided as a microprocessor or a plurality of microprocessors that are configured to execute the instructions sets stored in memory. A processor of a DPU may be a multipurpose, programmable device that accepts digital data as input, processes the digital data according to instructions stored in its internal memory, and provides results as output. The processor of a DPU may implement sequential digital logic. The DPUs and 2 may each include a system-on-a-chip comprising processing circuitry (e.g., one or more ARM-based cores, one or more x86-based cores), a network interface, and one or more acceleration engines. FIG. 2 illustrates an example structure for a DPU in more detail.

The DPUs 1 and 2 may also comprise memory which may correspond to any type of non-transitory computer-readable medium. In some embodiments, memory of a DPU may comprise volatile or non-volatile memory and a controller for the same. Non-limiting examples of memory include RAM, ROM, buffer memory, flash memory, solid-state memory, and/or variants thereof. Any of these memory types may be considered non-transitory computer memory devices even though the data stored thereby can be changed one or more times. In some embodiments, the memory may be configured to store rules and/or the instruction sets depicted in addition to temporarily storing data for the processor of the DPU to execute various types of routines or functions.

In some embodiments, the DPUs 1 and 2 are programmable such that a user can interact with the DPUs 1 and 2 to provide instructions. In such an embodiment, the network devices 14 and/or 22 may comprise one or more input, output, and/or display devices. In some embodiments, each network device 14 and 22 may comprise at least one display device that renders information, applications, windows, interactive elements, and/or other visual output via a user interface.

Although not explicitly shown, each network device 14 and 22 may include additional processing circuitry for performing computing tasks. For example, each network device 14 and 22 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, processing circuitry may comprise hardware, such as an application specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, and/or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

In addition, although not explicitly shown, it should be appreciated that the network devices 14 and 22 include one or more communication interfaces for facilitating wired and/or wireless communication (e.g., over communication network 18) between one another and other unillustrated elements of the system 100.

FIG. 2 illustrates an example structure for the DPUs in FIG. 1 according to at least one example embodiment. The DPU includes Network Interface Controller (NIC) subsystem 108 and a processor cores subsystem 104. The NIC subsystem 108 and processor cores subsystem 104 are connectable through a PCIe switch 116. While the DPU is shown to include a NIC subsystem 108 and processor cores subsystem 104, it should be appreciated that the DPU may include other processors including, without limitation, CPU processors, GPU processors, and/or any other suitable type of processing architecture.

The processor cores subsystem 104 may be configured to provide general processing capabilities and may include a processing complex 120, one or more acceleration engines 124, and one or more network interfaces 128. The processing complex 120 may include one or multiple processing cores (e.g., Advanced RISC Machine ("ARM") processing cores, RISCV cores, CPU cores, GPU cores, etc.). One or more processing cores of the processing complex 120 may include programmable cores 136 and/or circuitry 148 as shown in the NIC subsystem 108; however, such components are not shown for ease of reference and discussion.

The acceleration engine(s) 124 may provide hardware acceleration capabilities for the processors in the processing complex 120 and/or for external GPU(s) 164. As an example, a processing core in the processing complex 120 may use one or more acceleration engines 124 to perform a specific function whereas other undefined functions may be performed within the processing core of the processing complex 120. The acceleration engine(s) 124 can be appropriately configured to perform specified functions more quickly, with fewer computations, etc. as compared to other components of the processing complex 120.

The network interface(s) 128 may provide connectivity between components of the processor cores subsystem 104 and other components external to the processor cores subsystem 104. For example, the network interface(s) 128 may provide connectivity to the PCIe switch 116 and/or one or more other external elements, such as an external network 152, a double data rate (DDR) device 156, a solid state disk (SSD) 160, and/or a GPU 164.

The network interface(s) 128 may include physical, mechanical, optical, and/or electrical components that allow a remote device to communicate with the processing complex 120 and/or acceleration engine(s) 124 of the processor cores subsystem 104. The network interface(s) 128 may enable physical connections to a cable, wire, fiberoptic, etc. Alternatively or additionally, the network interface(s) 128 may facilitate wireless communications, in which they may include one or more antennas, drivers, or the like.

The NIC subsystem 108 is another element of the DPU in FIG. 2. It should be appreciated that the components of the NIC subsystem 108 and components of the processor cores subsystem 104 may be in communication with one another via the PCIe switch 116 or by some other communication mechanism. The NIC subsystem 108 and processor cores subsystem 104 may be provided on a common substrate, motherboard, or silicon. Alternatively, the NIC subsystem 108 and processor cores subsystem 104 may be provided on totally separate substrates, motherboards, or silicon.

As a non-limiting example, the NIC subsystem 108 may provide functionality similar to or the same as a network adapter or other type of networking device. Illustrated components provided in the NIC subsystem 108 include, without limitation, a Data Processing Accelerator (or Data Path Accelerator) (DPA) 132 and one or more network interfaces 128. The DPA 132 may include one or more programmable cores 136, memory 140, a vector instruction list 144, and circuitry 148. The circuitry 148 may include hardware and/or software for executing the vector instruction list 144. While illustrated as separate components, it should be appreciated that certain components of the DPA 132 may be combined with one another. For instance, the vector instruction list 144 and/or circuitry 148 may be included in the one or more programmable cores 136. Alternatively or additionally, the memory 140 may be provided external to the DPA 132 or may be integrated as part of the programmable core(s) 136.

The programmable core(s) 136 may include one or more hardware and/or software components that are programmable and may support one or more functions of the DPU in FIG. 2. Examples of a suitable programmable core 136 include, without limitation, a programmable logic core ("PLC"), a programmable logic array ("PLA"), etc. The programmable core(s) 136 may be implemented in hardware and/or software on any type of medium. For instance, the programmable core(s) 136 may be provided as a programmable SoC, a programmable ASIC, a programmable digital circuit, combinations thereof, or the like. The programmable core(s) 136 may be similar or identical to other cores described herein, such as processing cores that were described as being included in the processing complex 120. In some embodiments, the programmable core(s) 136 and/or circuitry 148 may be configured to perform matrix multiplication functions.

The memory 140 may correspond to any suitable type of memory device or collection of memory devices already described herein. Non-limiting examples of devices that may be provided as memory 140 include RAM, ROM, flash memory, buffer memory, combinations thereof, and the like. In some embodiments, the memory 140 may be cache line aligned.

The vector instruction list 144 may include one or more instructions (e.g., vector instructions) that are capable of being performed in the programmable core(s) 136 and/or circuitry 148. In some embodiments, the vector instruction list 144 may provide a listing of functions that can be performed by the circuitry 148 or by other components (e.g., programmable core(s) 136, the GPU(s) 132, etc.). In some embodiments, functions (e.g., vector functions) that may be supported by a DPU and, thereby, made available in the vector instruction list 144 include, without limitation, non-linear functions, linear functions, a hyperbolic tangent function (tanh(x)) function, a sigmoid function, a Rectified Linear Activation (ReLU) function, a softmax function, a softsign function, and an Exponential Linear Unit (ELU) function. Other suitable functions (whether activation functions or not) may also be listed in the vector instruction list. Non-limiting examples of such functions other than an activation function include a matrix multiplication function, a multiply add function, a vector accumulate function, a vector add function, a vector multiply function, a vector load function, and a vector store function. One or more of the instructions provided in the vector instruction list 144 may be carried out completely in hardware (e.g., using the circuitry 148) and/or may utilize buffer(s) and/or a lookup table as will be described herein. In some embodiments, the circuitry 148 may be configured to compute matrix multiplication operations.

The network interface 128 of the NIC subsystem 108 may be similar or identical to the network interface 128 included in the processor cores subsystem 104 and may include hardware and/or software components that enable operations of the NIC subsystem 108 at the network layer. The network interface 128 may also facilitate connectivity to the PCIe switch 116. Examples of protocols that may be supported by the network interface 128 include, without limitation, Ethernet, WiFi, Fibre Channel, Asynchronous Transfer Mode ("ATM"), Fiber Distributed Data Interface ("FDDI"), RDMA/TCP/UDP, ASAP2, InfiniBand, etc.

The PCIe switch 116 may include hardware and/or software that includes an expansion bus for a PCIe hierarchy on the DPU. In some embodiments, the PCIe switch 116 may include switching logic that routes packets between one or more ports of the PCIe switch 116. The PCIe switch 116 may include two or more different ports that are included as or that are connected to the network interface(s) 128 of the NIC subsystem 108 and processor cores subsystem 104.

Figure 3:
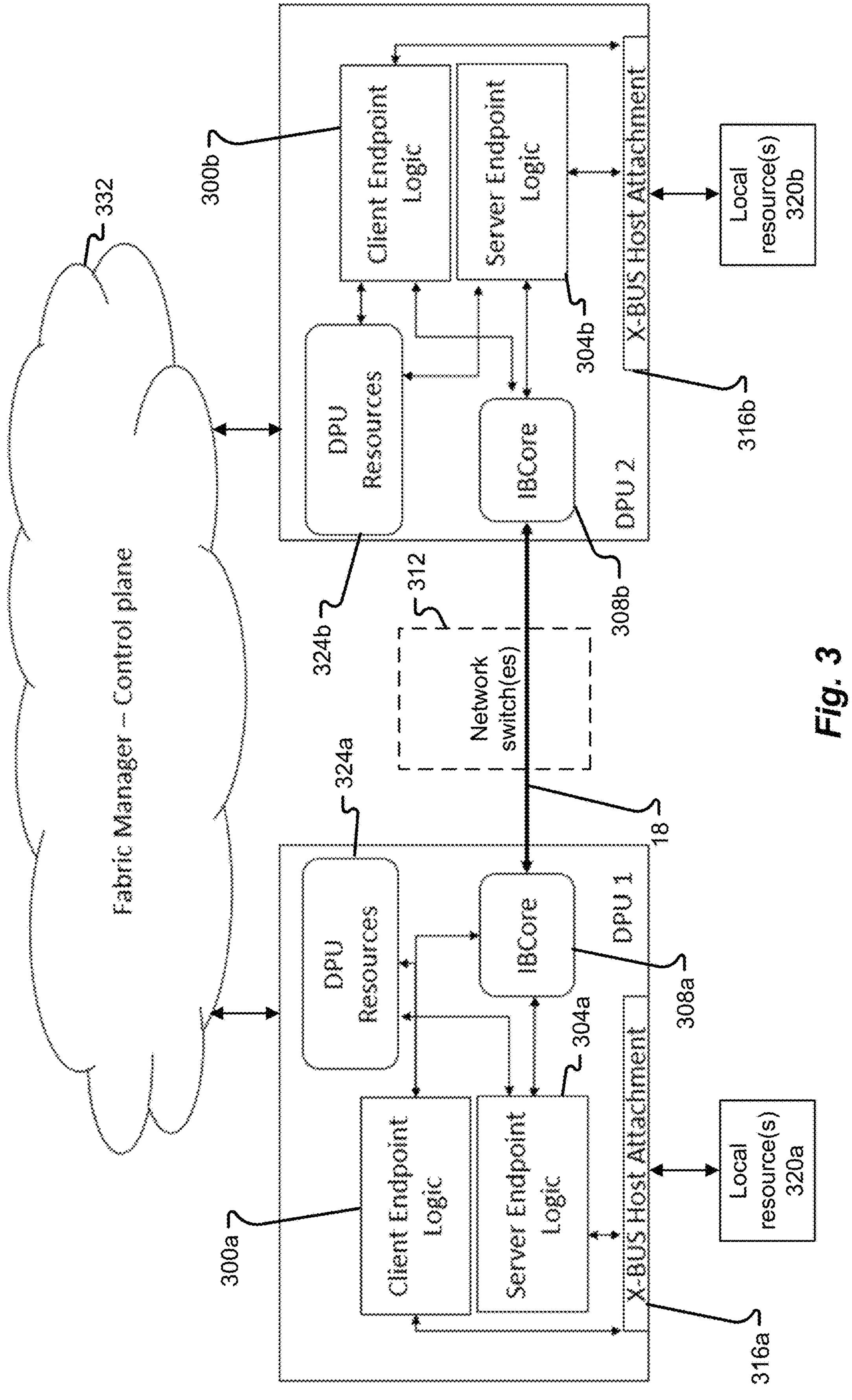
FIG. 3 illustrates a high-level block diagram of components in the networking system according to at least one example embodiment.

FIG. 3 illustrates a high-level block diagram of components in the system 100 according to at least one example embodiment.

As described herein, example embodiments relate to a fabric (e.g., a software-defined fabric) that is implemented on a DPU and that leverages a suitable transport technique (e.g., InfiniBand) to haul system interconnect traffic, which may include master-subordinate type traffic between resources within SoC boundaries. As used herein, an entity that initiates a request or transaction is referred to as master while an entity to which the request or transaction is directed is referred to as subordinate. With reference to FIG. 3, the fabric features two types of endpoint logic at each DPU 1 and 2: one type is the client endpoint logic 300*a* and 300*b* that serves mastering sides of resources (e.g., CPU Bus Interface Unit requests) associated with a respective DPU; and the other type is the server endpoint logic 304*a* and 304*b* which serves subordinate sides of resources (e.g., a memory controller) associated with a respective DPU. As a result of each DPU 1 and 2 including both types of endpoint logic, each DPU 1 and 2 may concurrently serve master and subordinate traffic. Stated another way, a DPU (e.g., DPU 1) may relay mastering traffic that originates from a local resource attached to that DPU to a remote subordinate resource via a counterpart DPU (e.g., DPU 2) and vice versa. Each client endpoint logic 300*a* and 300*b* and each server endpoint logic 304*a* and 304*b* may be implemented with any suitable hardware (e.g., logic circuits) from the DPU in FIG. 2.

As shown in FIG. 3, each DPU 1 and 2 may have respective host attachment InfiniBand cores (IB cores) 308*a* and 308*b*. Each IB core 308*a* and 308*b* may include suitable hardware and/or software for communicating signals across communication network 108 according to InfiniBand protocols. Optionally, the signals traveling between IB cores 308*a* and 308*b* are routed through one or more network switches 312, which may be included in the system 100.

Each DPU 1 and 2 may further comprise a respective host attachment interface 316*a* and 316*b*. The host attachment interfaces 316*a* and 316*b* may include any suitable interface that provides physical connection to one or more respective local resources or local hosts 320*a* and 320*b* (the "X-bus" notation for the host attachment interfaces 316*a* and 316*b* indicates that any suitable host peripheral bus technology may be supported). Examples of local resources 320*a* and 320*b* include CPUs, memories, memory controllers, GPUs, and/or other suitable devices that communicate with DPU 1 and/or DPU 2.

Each DPU 1 and 2 includes respective DPU resources 324*a* and 324*b*. The DPU resources 324*a* and 324*b* may correspond to one or more of the processing resources and/or memory resources mentioned above with reference to FIG. 2 (e.g., processing complex, processing cores, circuitry, memory, acceleration engines, etc.). In accordance with at least one example embodiment, each set of DPU resources 324*a* and 324*b*—by way of respective local client and server endpoint logic, for example—may be made available to local host(s), remote host(s), and/or remote DPU(s). For example, the local client and local server endpoint logic at each DPU 1 and 2 may enable the sharing of DPU resources of one DPU with host(s) attached to the host attachment interface of a counterpart DPU. Similarly, local DPU resources of one DPU may be shared with DPU resources of a counterpart DPU. Consider the following, non-limiting example regarding sharing of resources by DPU 1, which may include making DPU resources 324*a* available to local resources 320*a*, remote resources (i.e., local resources 320*b*), and/or remote DPU resources (i.e., DPU resources 324*b*). The same sharing concepts may apply to DPU 2 when sharing DPU resources 324*b* with DPU 1 and/or with resources 320*a* attached to the host attachment interface 316*a* of DPU 1. In any event, sharing of DPU resources across a network is enabled by the client and server endpoint logic at each DPU being physically attached to the appropriate communication bus. In addition, it should be appreciated that sharing DPU resources between DPUs may exclude the IB cores 308*a* and 308*b* from the datapath so that sharing of resources occurs over another suitable connection provided by the communication network 18.

FIG. 3 further illustrates a fabric manager control plane (or fabric manager) 332, which may perform functions to configure both DPUs 1 and 2 such that a remote master-subordinate connection is established between the DPUs. In at least one embodiment, the fabric manager 332 comprises an out-of-band orchestrator in the form of a subnet manager (e.g., an IB subnet manager) running on network switches 312. Additionally or alternatively, the fabric manager 332 comprises a DPU (e.g., DPU 1 and/or DPU 2), one or more isolated CPUs (e.g., as a local resource 320*a* and/or 320*b*), or both.

The description set forth below covers at least the following topics (not necessarily in order): the generic operations of the transaction layer of the latest low-latency host attachment protocols are described; master-subordinate communication modes and relevant requirements; InfiniBand transport integration and hardware interfaces; the datapath components of client endpoint logic and server endpoint logic; and the fabric manager control plane tasks and example configurations. Notably, the following discussion relates to the physical attachment of remote resources to a local host and does not necessarily deal with logical attachment (e.g., discovery of remote resource by device drivers and putting them under operating system control). However, example embodiments may be applied to logical attachment.

Figure 4:
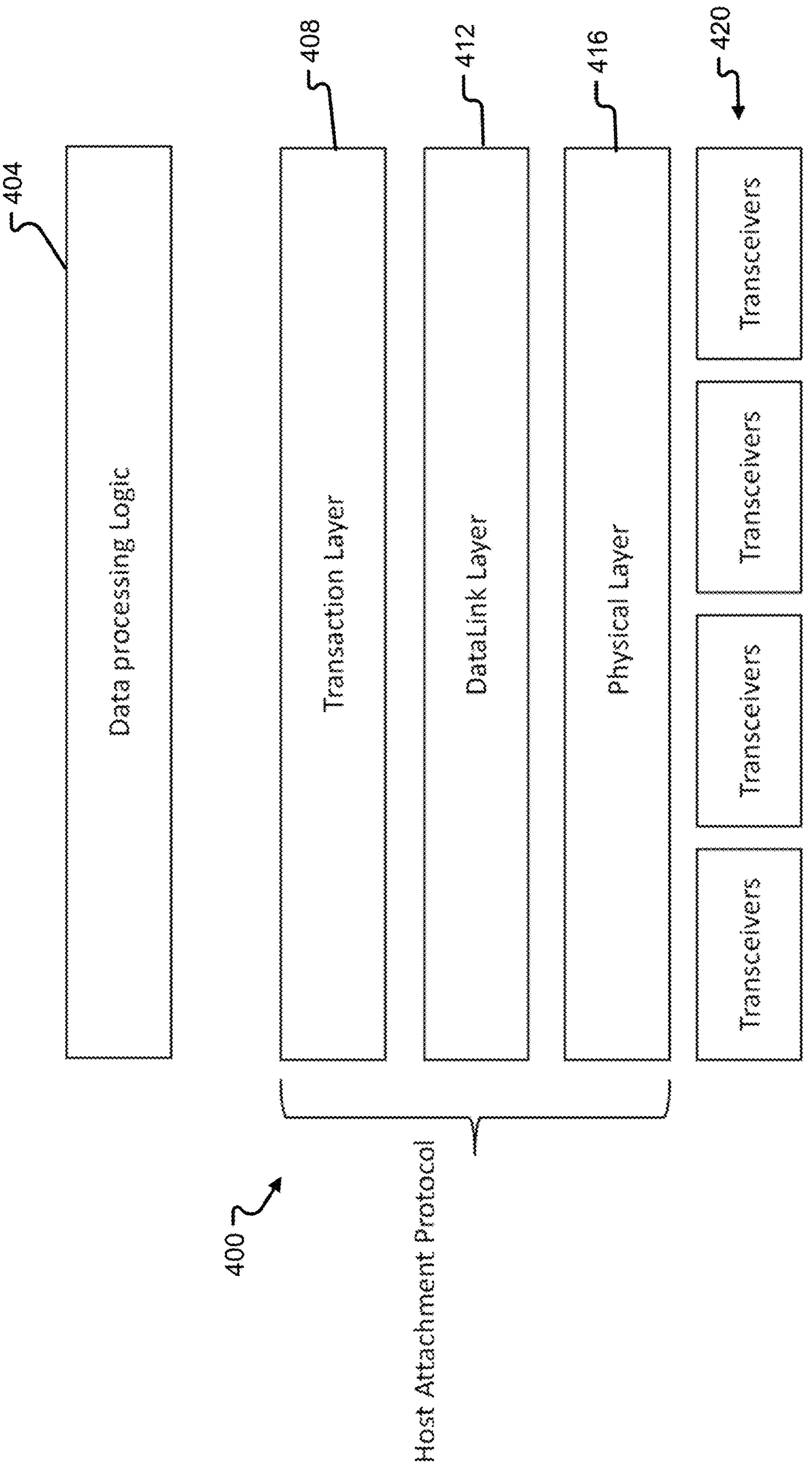
FIG. 4 illustrates a block diagram for a host attachment protocol stack according to at least one example embodiment.

FIG. 4 illustrates a block diagram for a host attachment protocol stack 400 according to at least one example embodiment. The protocol stack 400 includes a transaction layer (TL) 408 that interfaces with data processing logic 404 that is using the underlying interconnect services. That is, the data processing logic 404 may correspond to the client endpoint logic and/or server endpoint logic blocks shown in FIG. 3. The protocol stack 400 further includes a data link layer (DL) 412 and a physical link layer (PL) 416. The TL 408 is the layer where differentiation of flows of operations occurs and where data may be framed/parsed together with required annotations such as operation code, frame size, destination address, etc. DL 412 may offer a reliable pipe abstraction for use by the TL 408. DL 412 accepts flits (flow control units) and signaling to designate the frame boundaries and delivers received data, in-order, to the other side of a serializer/deserializer (SerDes) channel. The PL 416 drives the underlying transceivers 420 and performs data coding/scrambling to meet the serial transmission requirements.

Inventive concepts propose modifications to the TL 408 of the host attachment protocol 400. In at least one embodiment, the DL 412 and/or the PL 416 (which can be further subdivided or integrated) are abstracted (e.g., completely abstracted) under the TL 408. As described herein, host attachment devices (devices connected to interfaces 316) may utilize resources that are beyond normal boundaries. These devices may operate with load/store semantics (i.e., directly master relevant transactions towards a subordinate expecting a response or not (posted operations)). Example embodiments relate to at least the following categories of transactions:

- Configuration/discovery transactions: Configuration/discovery transactions are load/store non-cacheable operations that are mastered from an address range that is used for peripheral discovery and control (also referred to as MMIO region).
- Standard load and store transactions: These transactions haul the data traffic effectively exchanging data between host and peripheral. Load and store transactions may have a few fixed size variants depending on if the transaction is for hauling a cache line or for a "load immediate" instruction. Some variants also feature a byte enabled mask to serve subsequent commands.
- Atomic transactions: An atomic transaction is a special type of load and store transaction that takes advantage of the cache-coherent integration of peripherals and allows the execution of functionalities like "test and set lock" from a peripheral towards the host. Atomic transactions are classified differently due to possible different response handling (which might require the datapath to re-issue a command later in time).
- Interrupt commands: Interrupt commands are single direction commands with a direction from peripheral to host which may also be generated from the client or server logic for error control and/or the like.

Cache coherence protocol transactions: These transactions are for communication cases where CPU cache is being used (e.g., disaggregated main system memory); cache coherent integration of peripherals enables the peripherals to declare cache line ownership.

As described in more detail below with reference to various figures, data flits and transaction header flits may exist in different queues.

In the context of a traditional SoC main interconnect device, a master-subordinate communication scheme determines resource destinations based on an address. Each peripheral device attached to the SoC main interconnect device is memory mapped into the SoC main interconnect device memory layout so that each peripheral device occupies one or more dedicated or assigned address ranges. Subsequently, each transaction that targets a specific peripheral device is mastered to an address that falls within the boundaries of the assigned address range. Peripheral devices that master transactions use an address that falls within the range of addresses where the (subordinate) destination device is mapped, and thus, the destination device should also be mapped to a given memory address range so that the SoC main interconnect device can deliver data.

In the same or similar spirit, example embodiments propose host attachment protocols for local resources 320 attached to a host DPU by an interface 316 that feature two different modes. The first mode maps the local resource 320 as subordinate to the memory address space of the host DPU—subsequently, the host DPU masters requests towards the local resource 320. The second mode (see FIG. 5) operates in an opposite fashion—the local resource 320 masters transactions towards the host DPU using appropriate addresses that target a specific host resource (e.g., memory). These two host attachment peripheral interconnect modes are assigned different opcodes but otherwise perform similar or identical load and store operations.

Figure 5:
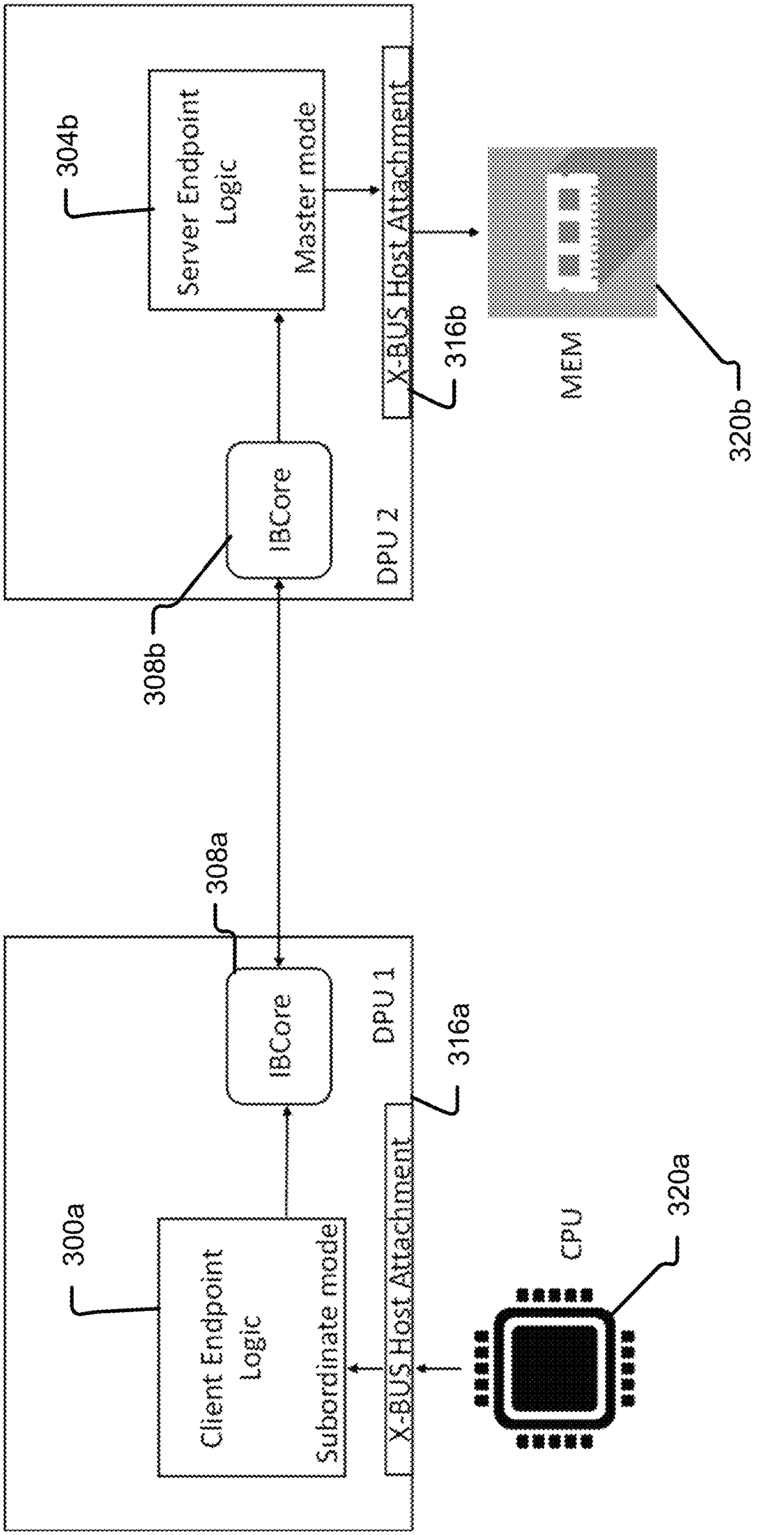
FIG. 5 illustrates an example transaction using components from FIG. 3 according to at least one example embodiment.

FIG. 5 illustrates an example transaction using components from FIG. 3 according to at least one example embodiment. Thus, FIG. 5 includes some of the same elements as FIG. 3, and these elements are not re-described here. As may be appreciated, FIG. 5 relates to a specific example for establishing a remote resource connection where a local resource 320*a* is embodied as a CPU and a local resource 320*b* is embodied as memory MEM.

In FIG. 5, the CPU attaches to local client endpoint logic 300*a* on a locally attached DPU 1 in a subordinate mode while a remote DPU 2 server endpoint logic 304*b* attaches to the local host memory MEM in master mode. Thereafter, transactions are mastered by the CPU towards the local client endpoint logic 300*a* and hauled over IB to the remote server endpoint logic 304*b*. The server endpoint logic 304*b* re-masters the transactions received from DPU 1 to local memory MEM. Thus, FIG. 5 depicts an example scheme for implementing memory disaggregation.

In general, client endpoint logic 300*a*, 300*b* is subordinate to a respective host (CPU or MEM in FIG. 5) and is appropriately mapped to a defined memory address range, which allows the client endpoint logic to receive mastered transactions according to the above-described first mode. In addition, server endpoint logic 304*a*, 304*b* leverages the above-described second mode which enables the server endpoint logic to master transactions towards local host resources 320*a*, 320*b*

As may be appreciated, each pair of client and server endpoint logic (one at DPU 1 and the other at DPU 2) are mapped to/use a respective locally attached host memory layout. However, it is highly unlikely that the mappings are aligned given that each mapping is dependent on the number and/or type of attached local resources 320*a* and 320*b*. Accordingly, memory translation of transaction addresses is required. Secondly, given the two different modes of host attachment protocol, the opcodes of the transactions that are received by a server endpoint logic (e.g., 304*b*) from a client endpoint logic (e.g., 300*a*) are different from the opcodes that should be used at the server endpoint logic (e.g., 304*b*). As such, the opcodes should be translated before transmission to the remote entity as well. Address and opcode translation are discussed in more detail below with reference to various figures.

Figure 6:
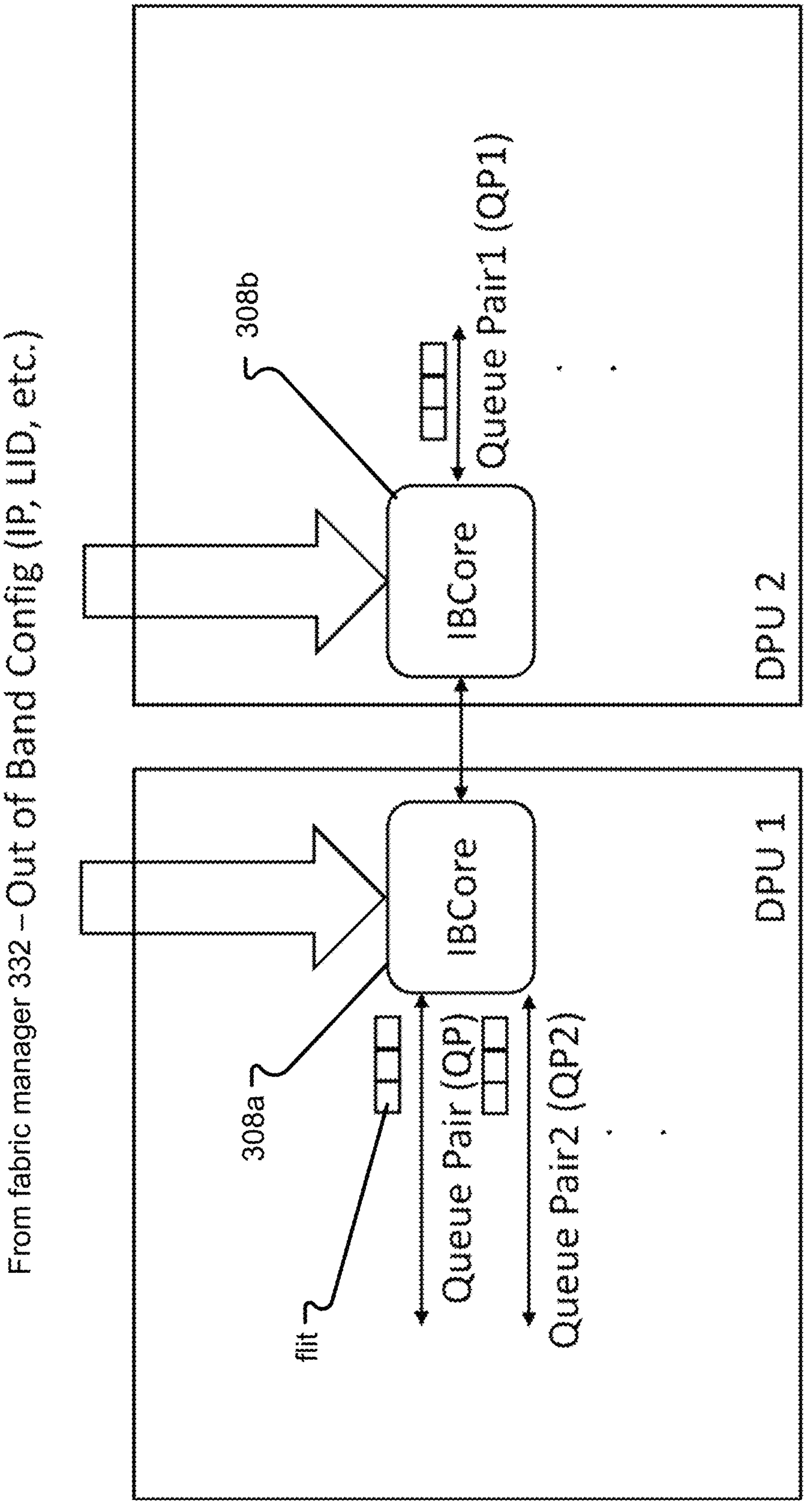
FIG. 6 illustrates details for configuring a transport interface according to at least one example embodiment.

FIG. 6 illustrates details for configuring a transport interface according to at least one example embodiment. Specifically, FIG. 6 illustrates an example where the transport interface corresponds to IB cores 308*a* and 308*b* from FIG. 3. Each IB core 308*a* and 308*b* receives device driver configuration information from the fabric manager 332 to establish a dedicated channel with a counterpart IB core in the IB network. The configuration information may include forwarding (e.g. IB queue-pair address), security (e.g. address key) and Quality of service (QoS) information that instruct the hardware transport logic to bring up a communication channel. Each channel formed in this manner is a Queue Pair (QP) to indicate that virtual ingress and egress queues are bound to the two channel endpoints. Stated another way, a Queue Pair defines an endpoint of a specific flow. An established IB QP may be referred to as an IB Virtual Channel (VC) to reflect the provided service and to cover other potential interface configurations of the IB cores. An IB QP may be established in several connectivity modes that provide different types of service. At least one example embodiment relates to a Reliable Connection (RC) mode that provides a reliable pipe for network communication that handles retransmissions, in-order delivery, and backpressure.

Example embodiments will now be described with reference to the various egress and ingress paths for the client endpoint logic 300*a*, 300*b* and the server endpoint logic 304*a*, 304*b*.

Figure 7:
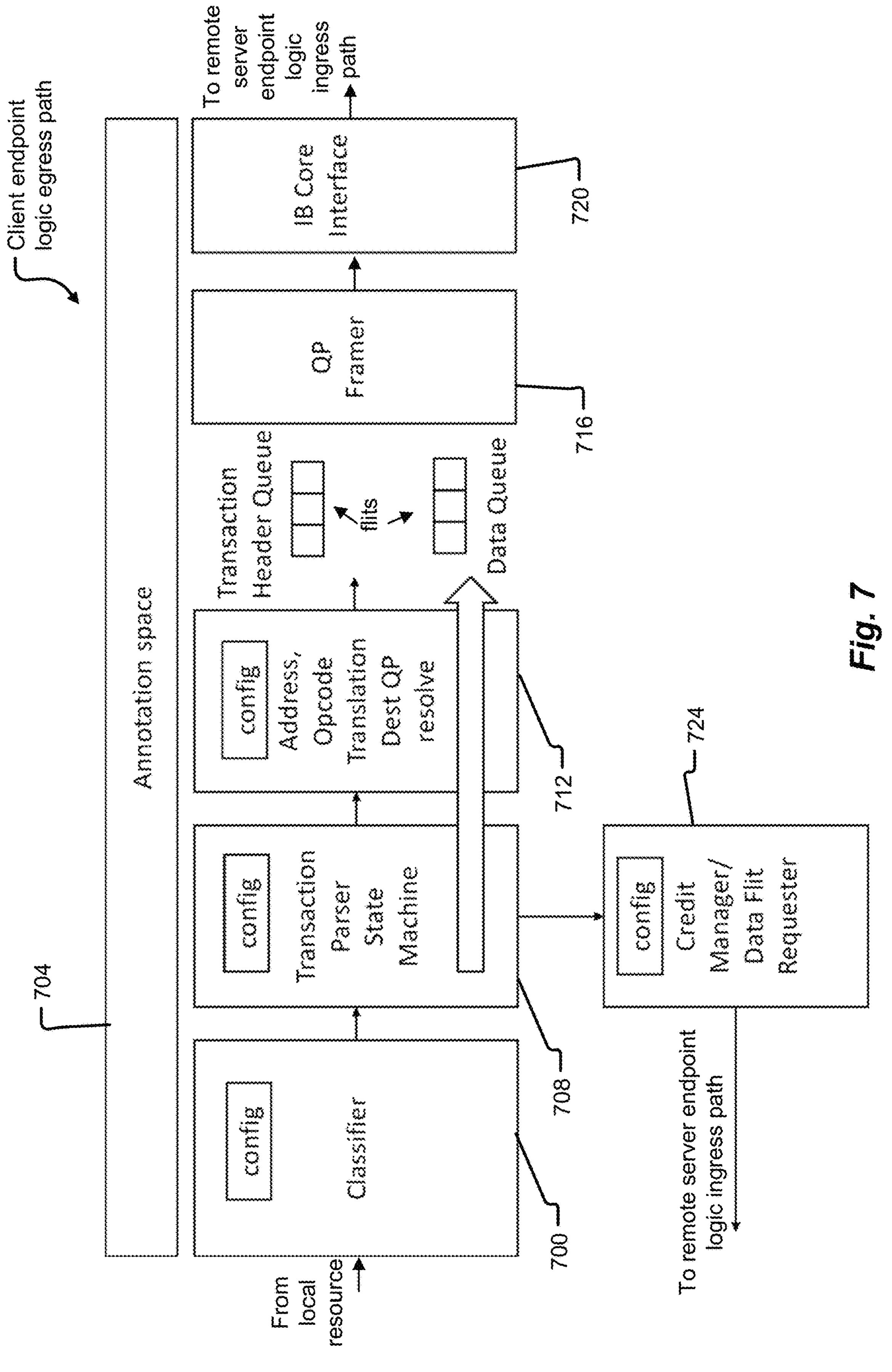
FIG. 7 illustrates an egress path for client endpoint logic according to at least one example embodiment.

FIG. 7 illustrates an egress path for client endpoint logic 300*a* and 300*b* according to at least one example embodiment. In FIG. 7, a client endpoint logic 300*a*, 300*b* receives mastered transactions from local host resources 32*a*, 320*b* and prepares the transactions IB transport. In accordance with at least one embodiment, the transactions are received at the TL 408 of the host attachment interconnect protocol stack 400 and are mastered by local host resources 320*a* or 320*b* towards the appropriate subordinate client endpoint logic 300*a* or 300*b*. As shown, the client endpoint logic egress path includes a number of functional blocks that may be implemented with hardware (e.g., logic circuits): a classifier 700, an annotation space 704, a transaction parser or transaction parser state machine 708, a translator 712, a QP framer 716, an IB core interface 720 and a credit manager/flit requester 724.

Figure 11:
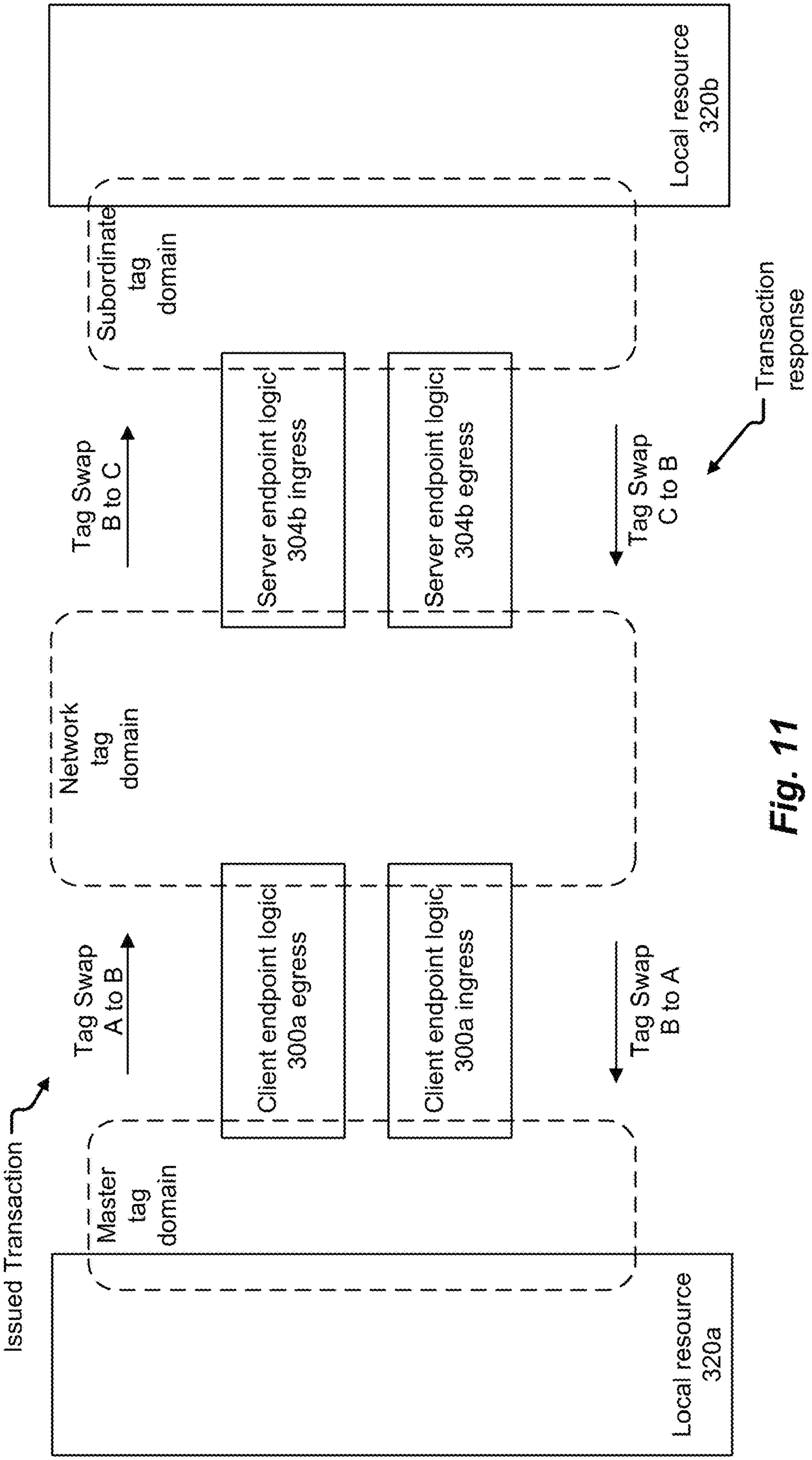
FIG. 11 illustrates a tagging scheme according to at least one example embodiment.

In operation, the classifier 700 determines the transaction's type based on a transaction header flit of the transaction and creates an entry in a lookup table of annotation space 704 (which may correspond to a design scratchpad memory available to the client endpoint logic). The transaction type may correspond to one of the types discussed above with reference to FIG. 4. An index of the lookup table or identifier is returned by the annotation space 704 and serves as the transaction's tag before a response is returned (e.g., by a client ingress path discussed below) or a posted transaction is completed. FIG. 11 and related text describe tag swapping in more detail. Configuration information config for the classifier 700 may include information to help the classifier identify the type of transaction. For example, the configuration information of the classifier 700 may include information that matches at least part of a transaction header with one of the types of transactions discussed above with reference to FIG. 4.

The classifier 700 then informs the transaction parser 708 about which transaction header has been detected on the received transaction header flit. Transaction parser 708 configures the state machine for the specific transaction type and separates the transaction's header flits from the transaction's data flits. The configuration information config of the transaction parser 708 may be used to configure the state machine in a manner that is useful for the particular type of transaction detected by the classifier 700. For example, each type of transaction may be passed through a state machine that is specifically configured for that type of transaction as indicated by the configuration information of the transaction parser 708.

Three fields of the transaction are of interest to the transaction parser 708: i) the transaction opcode bits, ii) the address bits, and iii) size of the data in bits (e.g., if the transaction is a store operation). The state machine of the transaction parser 708 determines the address and opcode of the transaction and sends the address and the opcode along with the header flit to the translator 712. Concurrently, the transaction parser 708 informs the local credit manager 724 to send a credit return to the counterpart remote server endpoint logic ingress path (see FIG. 9). In general, credits are employed for backpressure reasons, and a credit return transaction template is configurable and is managed by the fabric manager 332. The configuration information config of the credit manager 724 may inform on the number of available credits and a number of total credits.

With regard to credits and with reference to FIG. 4, TLs 408 of the host attachment protocol stack 400 employ the mechanism of credits to implement backpressure schemes so that receive sides do not overflow with transactions. One problem with related art schemes is the SerDes channel is a one way pipe that has many flits or transactions in flight, so it is difficult to implement a simple signal to help determine if the receive side can accept flits. Example embodiments, however, employ a credit mechanism as follows: an initial number or pool of credits that reflects the available flit slots (or transaction slots) on a receiving queue is transmitted by each receive (Rx) side to the transmit (Tx) side counterpart upon link initialization (e.g., upon formation of a Queue Pair in FIG. 6 or at some other suitable time). In operation, a credit is consumed each time a Tx side sends a flit and the pool of credits is decremented accordingly, which is reflected in FIGS. 7-10 with functional blocks 724 and 924. These credits are subsequently returned by Rx side back to the Tx side (using the opposite Tx/Rx pair) upon removal of incoming data from the Rx side queue. Upon return of a credit to the Tx side or upon receipt of notification at the Rx side that a transaction is complete at the Rx side, the pool of credits at both the Tx side and the Rx side are incremented accordingly to indicate that the Rx side has room to receive more flits. The credits are maintained and tracked at the TL 408 (e.g., in an annotation space) and different types of transactions may have different queues and maintain different types and/or numbers of credits for each queue.

The translator 712, using a suitable lookup structure and the transaction address, determines the IB QP(s) that should be used for the transaction and applies a proper address offset to accomplish address translation. The translator 712 may use any suitable translation scheme for address translation. As noted in the description of FIG. 5, the opcode of the transaction initially received by the classifier 700 should be changed to ensure proper handling at the server endpoint logic of the remote DPU. Thus, the translator 712 changes the opcode determined by the transaction parser 708 to an appropriate opcode before the transaction's header flits are delivered to the next stage. As shown, data flits of transactions and header flits of transactions remain separated and, more specifically, data flits may bypass the translator 712 and proceed directly from the transaction parser 708 to the QP framer 716 as shown by the arrow. At this point, the transaction has been formatted to be mastered to the remote resource and is queued at the transaction header queue. The configuration information config of the translator 712 may correspond to the lookup table that is used to assist with determining the IB QP(s) that should be used for the transaction. Such configuration information may also be used to accomplish address translation and/or opcode translation.

QP framer 716 may include logic that aggregates flits destined for the same IB Queue Pair to increase or maximize the burst of the transfers. In at least one embodiment, the QP framer 716 may also implement transaction header flit compression to reduce or minimize the corresponding overhead. Compression may involve combining header flits from multiple transactions and/or removing redundant header flits. In addition, in order to maximize throughput, QP framer 716 examines transaction header flit annotations to determine how many data flits are needed so that multiple completed transactions can be packaged in a same frame. These enhancements ensure that the ingress path of the remote server endpoint logic will not stall transaction processing while waiting for the required flits to arrive in a follow-up frame.

The QP framer 716 passes the transaction or aggregated transactions to the IB core interface 720 for transmission to an IB core 308*a* or 308*b*.

As may be appreciated from FIG. 7, the classifier 700, the transaction parser 708, the translator 712, and the credit manager 724 are configurable in that each functional block includes or accesses respective configuration information "config."

Figure 13:
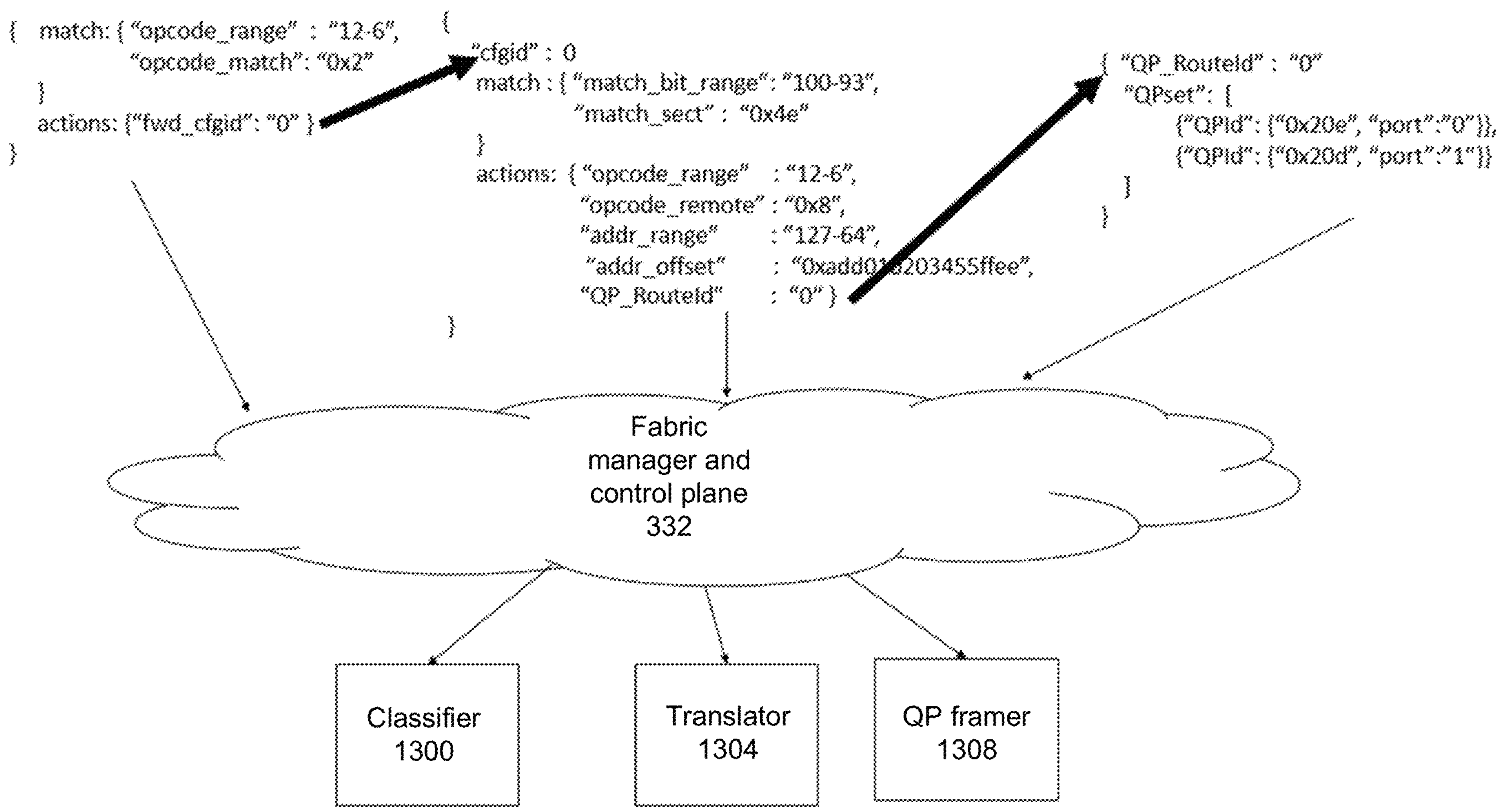
FIG. 13 illustrates a block diagram relating to a fabric manager according to at least one example embodiment.

In any event, the configuration information of each functional block discussed above may vary in accordance with network design choices. For example, the total number of credits tracked by the configuration information of the credit manager 724 may change depending on capabilities of a receive side. FIG. 13 and related text describe configuration information in additional detail as well as how example embodiments provide a chaining mechanism that enables each stage or functional block in FIG. 7 (and FIGS. 8-10) to pass along information to a next stage or functional block to assist the next stage with performing its associated operations.

Here, it should be appreciated that the blocks illustrated in FIG. 7 are presented in terms of functionality and that depending on the implementation, achieved timing closure, and other design constraints, multiple instances of the blocks illustrated in FIG. 7 may be used.

Figure 8:
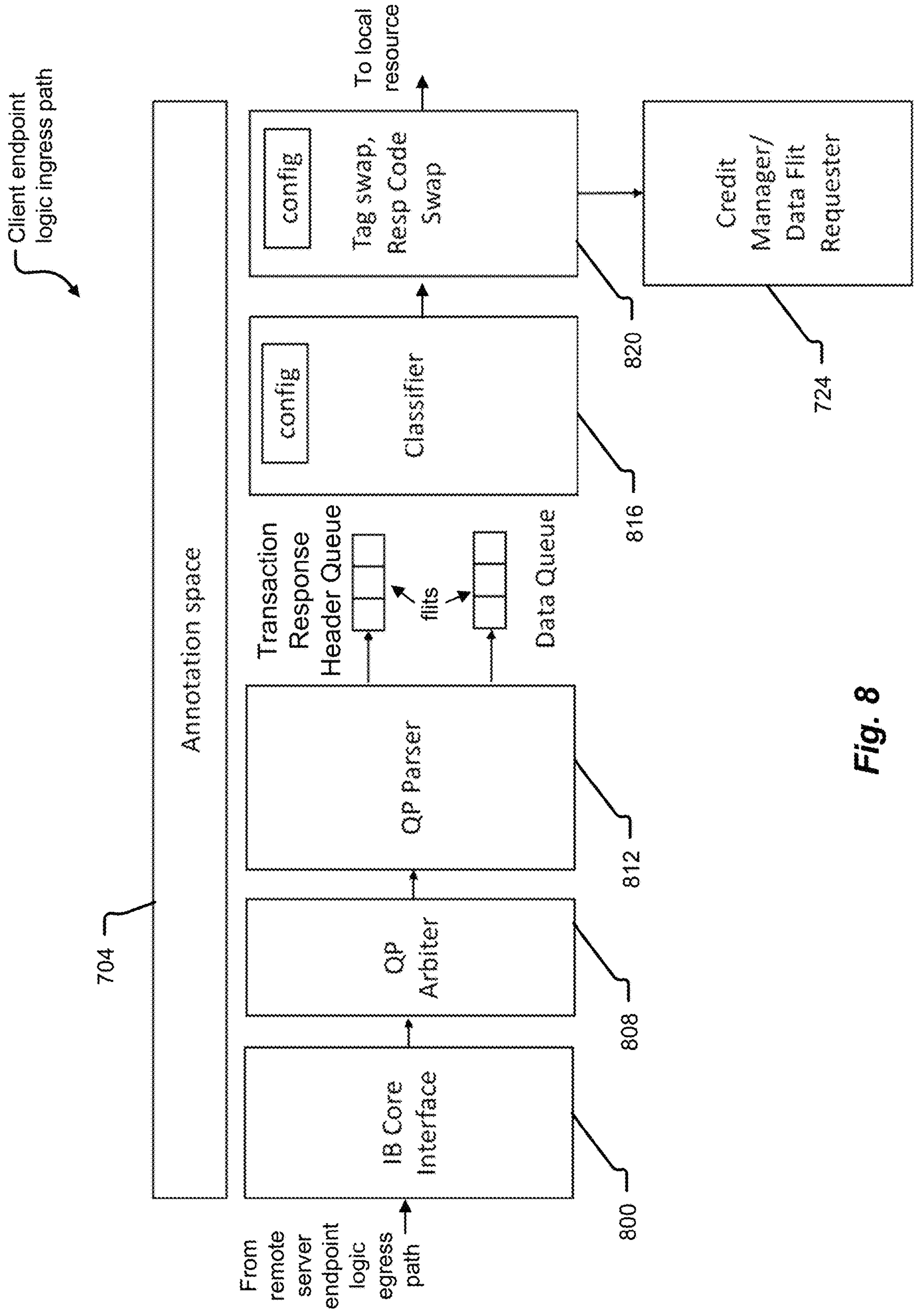
FIG. 8 illustrates an ingress path for client endpoint logic according to at least one example embodiment.

FIG. 8 illustrates an ingress path for client endpoint logic 300*a* and 300*b* according to at least one example embodiment. As may be appreciated, the client endpoint logic ingress path receives transaction responses from a remote counterpart server endpoint logic 304*a* or 304*b*. FIG. 8 illustrates a number of functional blocks including an IB core interface 800, the annotation space 704 (the same annotation space as in FIG. 7), a QP arbiter 808, a QP parser 812, a classifier 816, a swapper 820, and a credit manager/flit requester 724 (the same element as in FIG. 7).

Transaction responses arrive framed at the IB core interface 800 from an IB core 308 of a DPU. The QP arbiter 808 includes logic that accepts packets from the established IB QPs in a fair manner (e.g., round robin). Subsequently, the QP parser 812 includes logic that receives and parses transaction response header flits and data flits to form appropriate data and transaction response header queues. The classifier 816 consults configuration information config to determine the type of the transaction response received and inform the software-defined swapper 820 that performs response opcode swap (for the same reason as that noted in the description of FIG. 7) and patches back the original tag that was used by the mastered transaction upon arrival to the client endpoint logic egress path in FIG. 7 (the original tag of a transaction may originate from the initiating local resource 320—the original tag is replaced by the tag provided by the annotation space 704 to the classifier 700; see FIG. 11 and related text). The configuration information config for the classifier 816 may include the same or similar information as classifier 700 to help the classifier 816 identify the type of transaction associated with the transaction response. For example, the configuration information of the classifier 816 may include information that matches at least part of a transaction response header with one of the types of transactions discussed above with reference to FIG. 4.

The credit manager 724 may receive a notification from the swapper 820 that the transaction response is successfully received/processed (meaning that the transaction is complete) and free up a suitable number of credits for additional transactions (e.g., free up one credit per completed transaction). Notably, the annotation space 704 is the same as in FIG. 7 so that all transactions that are in-flight (not completed) are logged in the same data structure, which enables accurate tracking of in-flight and completed transactions. The configuration information config of the swapper 820 may be used to accomplish opcode translation and tag swapping (see FIG. 11 and related text for more details on tag swapping).

Here, it should be appreciated that the blocks illustrated in FIG. 8 are presented in terms of functionality and that depending on the implementation, achieved timing closure, and other design constraints, multiple instances of the blocks illustrated in FIG. 8 may be used.

Figure 9:
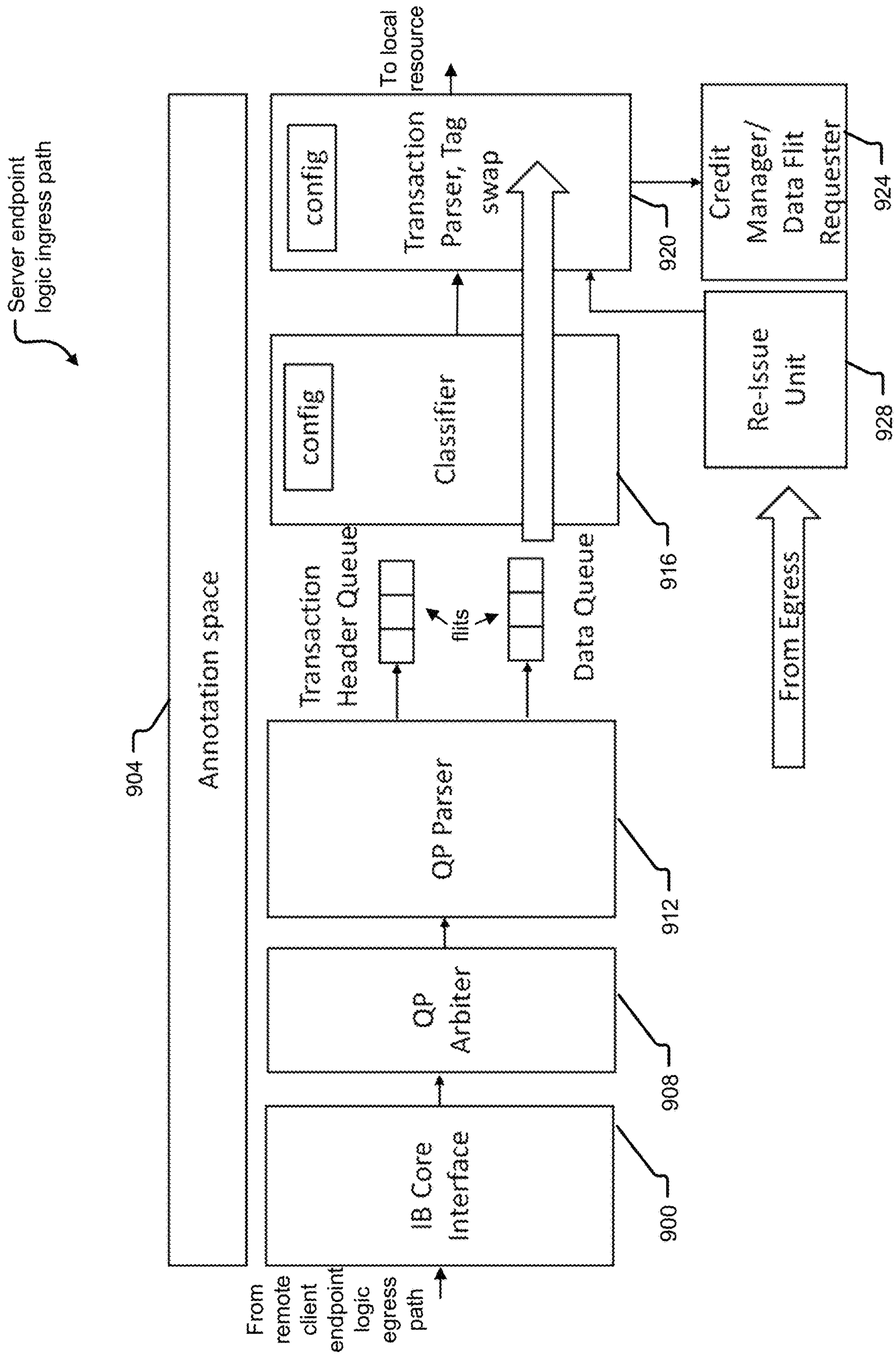
FIG. 9 illustrates an ingress path for server endpoint according to at least one example embodiment.

FIG. 9 illustrates an ingress path for server endpoint logic 304*a* and 304*b* according to at least one example embodiment. The ingress path for server endpoint logic includes an IB core interface 900, annotation space 904 (having the same or similar structure as the annotation space 704 from FIGS. 7 and 8; noting that a single annotation space may be used by both the client and server endpoint logics of a single DPU), a QP arbiter 908, a QP parser 912, a classifier 916, a transaction parser and tag swapper 920, a credit manager 924, and a reissue unit 928.

In operation, the IB core interface 900 accepts IB frames which contain transactions that have been mastered at the client side by, for example, the egress path of a client endpoint logic 300*a* or 300*b*. Transactions received by the server endpoint logic ingress path are directly mastered to the designated local resource 320 (e.g., mastered to a memory local to the server endpoint logic). The QP arbiter 908 receives frames from all concurrently established QPs arriving from different remote clients and delivers the frames (according to suitable programmed policies) to QP parser 912 that subsequently splits each frame into a transaction header and data that are queued appropriately as transaction header flits and data flits.

The classifier 916 determines the transaction type (which may correspond to one of the types discussed above with reference to FIG. 4) and informs a state machine of the transaction parser 920, which subsequently forwards the correct mix of header and data flits downstream to a local resource 320 (local resource not explicitly shown but should be understood to be in communication with the output of the transaction parser/tag swapper 920). The configuration information config for the classifier 916 may include the same or similar information as the configuration information in classifiers 700 and/or 816 information to help the classifier 916 identify the type of transaction. For example, the configuration information of the classifier 916 may include information that matches at least part of a transaction header with one of the types of transactions discussed above with reference to FIG. 4.

Before the transaction is forwarded to the local resource, the transaction parser/tag swapper 920 replaces a tag of the transaction as received from the remote client endpoint logic with a tag that is unique to the domain of the remote server endpoint logic. The replaced tag (i.e., the tag of the transaction as received from the client endpoint logic) is stored in the annotation space 904 so that a server endpoint logic egress path (see FIG. 10) can later perform another tag swap that retrieves the tag to send back to the client endpoint logic ingress path along with a transaction response. The configuration information config of the transaction parser/tag swapper 920 may be used to configure the state machine in a manner that is useful for the particular type of transaction detected by the classifier 916. For example, each type of transaction may be passed through a state machine that is specifically configured for that type of transaction as indicated by the configuration information of the transaction parser/tag swapper 920. The configuration information of the transaction parser/tag swapper 920 may include an association of tags that enable the tag swapping described herein.

The credit manager 924 handles backpressure in the same manner as that described above for FIGS. 7 and 8. For example, the credit manager 924 receives a notification from the transaction parser and tag swapper 920 that the transaction response is successfully received/processed and updates a number of available credits to reflect that the transaction is in-flight (e.g., the number of available credits is decremented by a suitable amount).

As further shown in FIG. 9, transactions may arrive at the transaction parser/tag swapper 920 via the re-issue unit 928. Re-issued transactions are transactions that may have failed due to a local resource's temporary inability to serve the transactions. For example, re-issued transactions may have failed due to an address translation not-in-place fault, a page fault, and/or the like, which may require software intervention to (re)program memory management units. In another example, a reissued transaction may comprise an atomic transaction that failed to acquire a lock. In at least one embodiment, transactions are stored in the annotation space 904 in their entirety before being issued for the first time and are re-issued by the re-issue unit 928 upon signaling from the server endpoint logic egress path in FIG. 8, which detects the relevant "not ready" or "not available" types of responses from the local resources 320. In other words, the server endpoint logic egress path may be capable of detecting that a local resource is not accessible prior to the first attempt to complete a particular transaction so that the transaction is held in the annotation space 904 until the local resource is determined to be accessible.

Here, it should be appreciated that the blocks illustrated in FIG. 9 are presented in terms of functionality and that depending on the implementation, achieved timing closure, and other design constraints, multiple instances of the blocks illustrated in FIG. 9 may be used.

Figure 10:
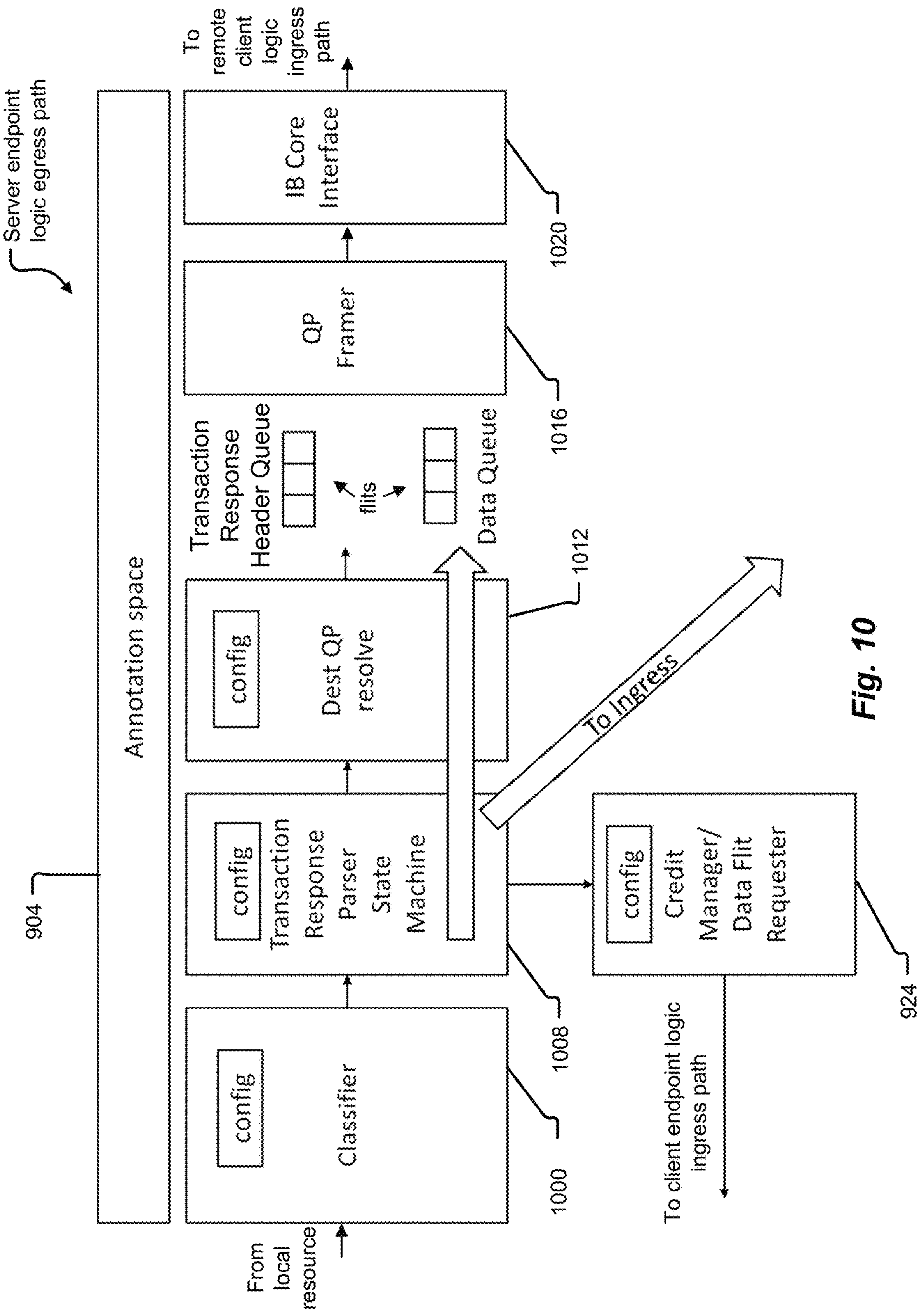
FIG. 10 illustrates an egress path for server endpoint according to at least one example embodiment.

FIG. 10 illustrates an egress path for server endpoint logic 304*a* and 304*b* according to at least one example embodiment. The server endpoint logic egress path includes annotation space 904 (the same annotation space from FIG. 9), a classifier 1000, a transaction response parser 1008, a QP resolver 1012, a QP framer 1016, an IB core interface 1020, and a credit manager 924 (the same credit manager from FIG. 9).

The server endpoint logic egress path has many similarities with the client endpoint logic egress path in FIG. 7. One difference in FIG. 10 is that the transaction response parser 1008 receives additional configuration information to detect which transactions should be re-issued and notifies the server endpoint ingress side, for example, by sending the transaction's tag to the re-issue unit 928 in server endpoint logic ingress path. Subsequently, IB QP forwarding information is retrieved by the resolver 1016 from the annotation space 904 and transaction responses are sent back to the counterpart remote client endpoint logic ingress path. Notably, transaction responses use the same QP(s) from which the initial transactions arrived.

In operation, the classifier 1000 receives transaction responses and determines the type of transaction to which the transaction response belongs based on a transaction response header flit of the transaction response. The transaction type determined by the classifier 1000 may correspond to one of the types discussed above with reference to FIG. 4. The classifier 1000 may consult annotation space 904 for the old tag that was replaced by tag swapper 920 and replace a current tag (i.e., the tag assigned by tag swapper 920) with the old tag (i.e., the tag that the tag swapper 920 replaced).

The classifier 1000 then informs the transaction parser 1008 about the determined type of transaction to which the transaction response belongs. Transaction parser 1008 configures the state machine for the specific transaction type and separates the transaction response's header flits from the transaction response's data flits. Concurrently, the transaction parser 1008 triggers the local credit manager 924 to send a credit return to the remote counterpart client endpoint logic ingress path. The credit manager 924 may also update the number of available credits to reflect that a transaction has been successfully completed (e.g., the number of available credits is incremented by a suitable amount).

The resolver 1012, using a suitable lookup structure, determines the IB QP(s) that should be used for sending the transaction response from the transaction response header and configuration information. As shown, data flits of transaction responses and header flits of transactions remain separated and, more specifically, data flits may bypass the resolver 1012 and proceed directly from the transaction response parser 1008 to the QP framer 1016 as shown by the arrow. At this point, the transaction response has been formatted to be sent to the remote counterpart client endpoint logic ingress path is queued at the transaction header queue.

QP framer 1016 may include logic that aggregates flits destined for the same IB Queue Pair to increase or maximize the burst of the transfers. In at least one embodiment, the QP framer 1016 may also implement transaction header flit compression to reduce or minimize the corresponding overhead. Compression may involve combining header flits from multiple transactions and/or removing redundant header flits. In addition, in order to maximize throughput, QP framer 1016 examines transaction header flit annotations to determine how many data flits are needed so that multiple completed transactions can be packaged in a same frame. These enhancements ensure that the ingress path of the remote server endpoint logic will not stall transaction processing while waiting for the required flits to arrive in a follow-up frame.

The QP framer 1016 passes the transaction or aggregated transactions to the IB core interface 1020 for transmission to an IB core 308*a* or 308*b* for sending across the communication network 108.

FIG. 11 illustrates a tagging scheme according to at least one example embodiment. As noted in the discussion above, client and server endpoint logic implement transaction tags as a mechanism to track complete and incomplete transactions. The tag mechanism allows transactions that are not related to be issued asynchronously. Transaction responses may arrive in a different order than the order of the respective issued transactions, but tagging schemes according to example embodiments allows the mastering local resource to correctly match the transactions responses to respective transactions. In general, many transactions may be concurrently in flight, and each transaction should have a unique tag in different domains of the system to mitigate clashing. After a response for a transaction has been delivered back to the mastering entity, the tag for that transaction may be reused for another transaction. The tag issuing entity that also handles tag recycling may be the mastering side(s) or entity.

In at least one example embodiment, the mastering side does not have enough info to guarantee tag uniqueness throughout a transaction lifecycle. For example, another remote mastering entity may issue a transaction to the same remote resource and there is no guarantee that tags will not clash in the context of the server logic which will lead to catastrophic failures.

FIG. 11 illustrates the concept of tag domains: a master tag domain, a network tag domain, and a subordinate tag domain. Each mastering entity or local resource 320 generates tags in the master tag domain until the attached client logic performs a tag swap and the transaction subsequently enters the network tag domain. The client endpoint logic keeps an account of transactions in-flight and patches that tag back to a received transaction response. The network tag domain guarantees uniqueness between different mastering entities that may even belong to different interconnect technologies. Similarly, the server endpoint logic maintains its own subordinate tag domain to make sure that transaction tags cannot clash in the context of the server endpoint logic.

FIG. 11 illustrates the above concepts by way of a specific, non-limiting example in which the system employs tags A, B, and C for a particular transaction. As shown, the transaction receives an initial tag A upon creation at the mastering resource side 320*a*. In accordance with the discussion of FIG. 7, classifier 700 replaces tag A with tag B (e.g., retrieved from annotation space 704) and stores tag A as having been replaced by tag B for this particular transaction. Notably, tag B is unique to the network tag domain so as not to interfere with tags of other transactions handled by the client endpoint logic 300*a*. Thereafter, the transaction is transmitted to a remote counterpart server endpoint logic 304*b* with tag B.

As noted in the discussion of FIG. 9, transaction parser and tag swapper 920 replaces tag B with tag C and stores tag B to, for example, annotation space 904 in a manner that indicates tag B was replaced by tag C for this particular transaction. Notably, tag C is unique to the subordinate tag domain so as not to interfere with tags of other transactions handled by the server endpoint logic 304*b*. Thereafter, the transaction is transmitted to the subordinate side entity or local resource 320*b* for execution. Upon execution of the transaction at local resource 320*b*, the server endpoint logic 304*b* generates a transaction response for sending to the client endpoint logic 300*a* ingress path. As noted in the discussion of FIG. 10, classifier 1000 may consult annotation space 904 and replace tag C with tag B for sending the transaction response with tag B back across the communication network 18 to the client endpoint logic 300*a* ingress path. In accordance with the discussion of the client endpoint logic ingress path in FIG. 8, the swapper 820 may consult the annotation space 704 to replace tag B with tag A before returning the transaction response to the mastering side entity or local resource 320*a*. The local resource 320*a* can match the initial transaction to the corresponding transaction response because they have the same tag (i.e., tag A). Upon the local resource 320 successfully matching a transaction and a transaction response, the client endpoint logic 300*a* makes tag B available for use by another transaction traversing the client endpoint logic 300*a* egress path. Here, it should be appreciated that the tags in each domain may take any suitable format and/or be part of a transaction header and/or a transaction response header. In addition, the number of tags available for use by client endpoint logic and/or server endpoint logic may vary. In one embodiment, the number of available tags in a particular domain corresponds to a maximum number of possible in-flight transactions for handling by the client endpoint logic and/or the server endpoint logic.

Figure 12:
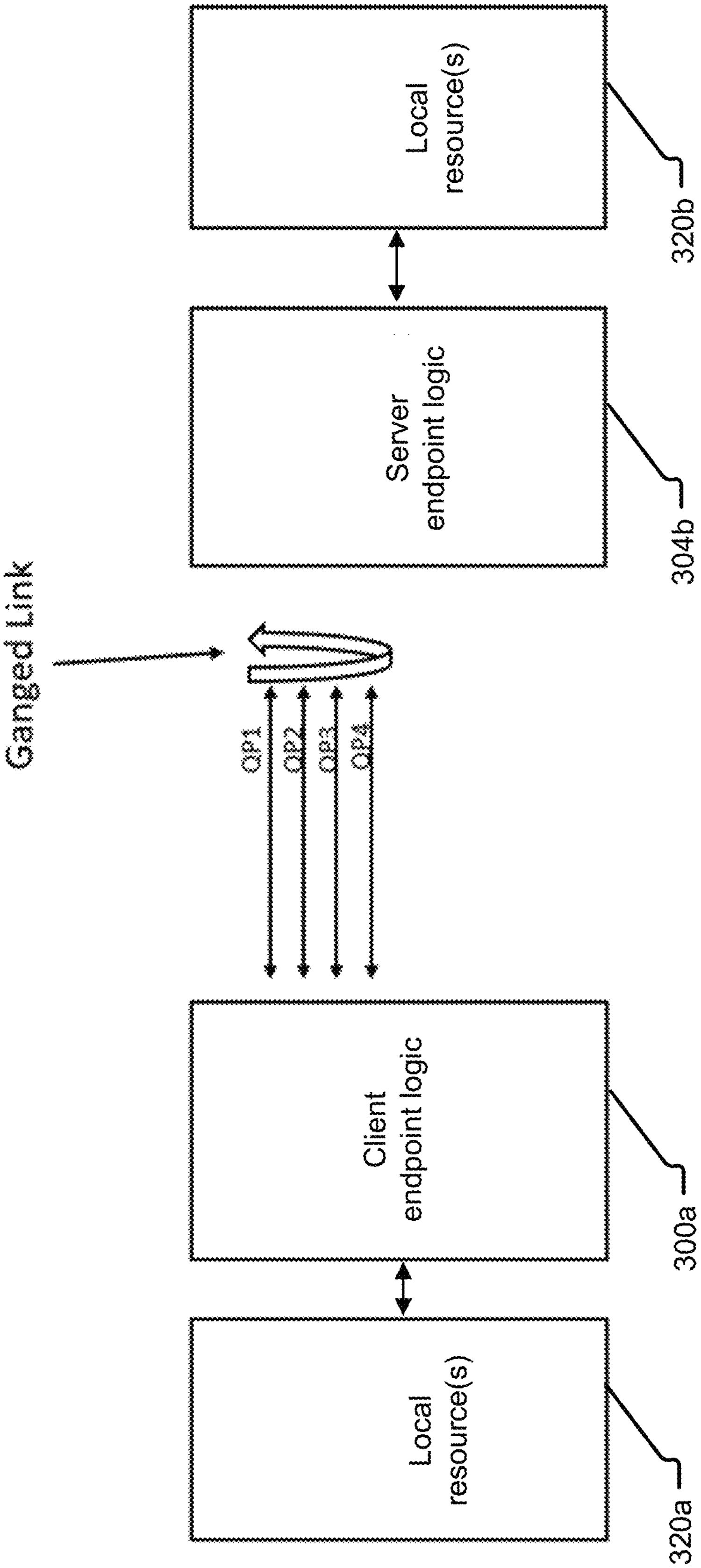
FIG. 12 illustrates QP ganging according to at least one example embodiment.

FIG. 12 illustrates QP ganging according to at least one example embodiment. In at least one example embodiment, ganging may relate to improving bandwidth of a particular master-subordinate link by using multiple ports of a DPU to serve that master-subordinate link. FIG. 12 illustrates an example with four IB QPs that are ganged to serve the same master-subordinate link to provide increased bandwidth for that link. The DPUs 1 and 2 may each include four IB ports for handling the ganged traffic. However, example embodiments are not limited thereto and the number of ganged QPs may vary, for example, according to the number of DPU ports available for handling traffic. The fabric manager 332 may select which QPs to gang because the fabric manager 332 has the overview of the deployment and overall data network utilization. An arbiter (e.g., of the fabric manager 332) may consult configuration information to accomplish load balancing among the provided QPs. For integrity reasons, each QP may transport completed transactions and/or transaction responses and transaction flits that belong to the same transaction (i.e., an entire transaction and an entire corresponding transaction response use a same QP), which enables independent operation at the receiving side. QP ganging may be implemented as an extension of the QP routing layer(s) in the egress paths of client endpoint logic 300*a* and the server endpoint logic 304*b* (e.g., the QP framer 716 and the QP framer 1016).

FIG. 13 illustrates a block diagram relating to a fabric manager 332 according to at least one example embodiment. Fabric manager 332 aspects of inventive concepts are related to the configurability of the hardware datapath(s) in FIGS. 7-10 and the generalized architecture uses configuration chaining. As described herein, some components shown in FIGS. 7-10 in the client and server endpoint logic paths are configurable and receive detailed information on how to process header flits. For example, at least some of the hardware components that have been previously described in the ingress/egress datapaths of client and server endpoint logic consult independent configuration information (labeled "config" in FIGS. 7-10), that, at the highest level, may be provided in a human readable form (e.g., XML or JSON).

Each stage or block in FIGS. 7-10 containing a "config" label associates a given set of configuration information config with an identifier that points to configuration information of the next stage or block, which enables a type of chaining of configuration information that follows a specific transaction as the transaction moves through the various stages of an egress or ingress path. The configuration information may provide a particular stage with designated actions to be performed on a transaction header (or transaction response header) received by that stage. In one example, each stage performs a match operation for the transaction header flit bits to determine the required operations (also called actions) that need to be performed on the transaction header. Additionally, the configuration information of one stage may provide the next stage with information that triggers the next stage to use its own specific set of configuration information based on the information provided by the previous stage.

By way of example, FIG. 13 illustrates functional blocks 1300, 1304, and 1308 and pseudocode for how the fabric manager 332 interacts with various stages of egress paths for client and/or server endpoint logic. The pseudocode shows how configuration information config of each stage is chained together. As shown, a classifier 1300 consults configuration information config to detect an opcode at a given range, for example, within a transaction header. In general, the configuration information config for each stage is provided by the fabric manager 332. The classifier 1300 determines the transaction type and forwards the transaction to the next stage (i.e., to translator 1304) along with an indication of the transaction type shown as "fwd_cfgid": "0." The translator 1304 performs opcode and address translation for remote execution of the transaction. The transaction type is already known from the classifier 1300 and the matching operations at translator 1304 identify to which remote memory address the transaction belongs. The translator 1304 performs the actions of swapping the opcode and changing the address. The translator 1304 may further determine an identifier "QP_RouteId" and pass the identifier to the QP framer 1308, which enables the QP framer 1308 to identify and set the QP for the transaction.

As may be appreciated, the classifier 1300 may correspond to an instance of the classifiers 700 and 1000, the translator 1304 may correspond to an instance of translator 712, and the QP framer may correspond to an instance of QP framers 716 and 1016. Although the configuration information config has been discussed with reference to egress paths, the ingress paths of client and/or server logic may have the same or similar chaining of configuration information config. For example, the classifier 1300 may correspond to an instance of classifiers 816 and 916.

The above-described chaining approach for configuration information config allows the same client and server endpoint logic, concurrently, to handle traffic that belongs to different interconnect architectures (e.g., PCIe CXL traffic concurrently with IBM OpenCAPI traffic and/or CCIX traffic, and/or the like). Stated another way, the client and server endpoint logic are able to address modern interconnect architecture requirements so long as the fabric manager provides the appropriate configuration information config to each relevant stage of an egress or ingress path.

Inventive concepts will now be described with reference various flow charts that relate to methods, devices, and systems discussed above with respect to FIGS. 1-13.

Figure 14:
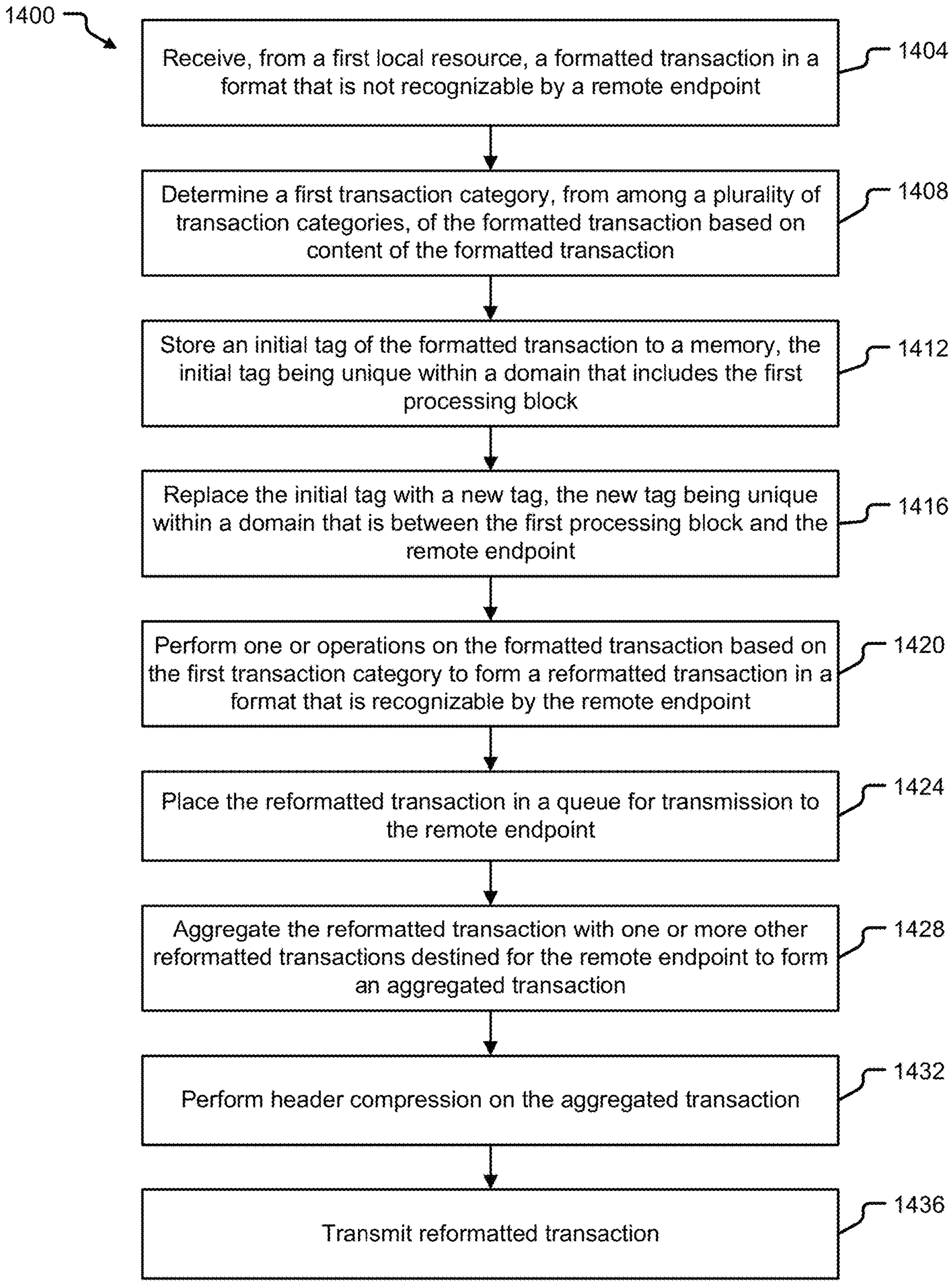
FIG. 14 illustrates a method for an egress path of client endpoint logic according to at least one example embodiment.

FIG. 14 illustrates a method 1400 according to at least one example embodiment. The method 1400 may include operations carried out by a processing block of a client endpoint logic 300*a*, 300*b* in FIG. 3, for example, a first processing block that comprises components in the client endpoint logic egress path as shown in FIG. 7. Accordingly, the method 1400 is described with reference to various elements from FIGS. 1-13. For the sake of explanation, the method 1400 is explained with reference to client endpoint logic 300*a* initiating a transaction to be served by server endpoint logic 304*b*, but may also be applied to client endpoint logic 300*b* when initiating a transaction to be served by server endpoint block 304*a*.

Operation 1404 includes receiving, from a first local resource, a formatted transaction in a format that is not recognizable by a remote endpoint. The formatted transaction may be received from a first local resource 320*a* by a processing block that corresponds to components of the egress path of client endpoint logic 300*a* in FIG. 7. Here, the remote endpoint may correspond to a remote counterpart device such as a network device comprising DPU 2 with server endpoint logic 304*b* coupled to local resource 320*b*.

Throughout the instant description, the terms "recognizable" and "unrecognizable" (or "not recognizable") are used in the following context, which makes reference to a specific non-limiting example involving a first endpoint and a second endpoint. A transaction initiated by a local resource of a first endpoint arrives at a client endpoint logic of the first endpoint in a format that is not recognizable by a remote, second endpoint. The initiated transaction as received by client endpoint logic of the first endpoint is considered unrecognizable by the second endpoint in the sense that server endpoint logic of the second endpoint would not recognize the opcode and/or the address (e.g., memory address for a read or write operation) if the initiated transaction was received by the second endpoint directly from the local resource of the first endpoint, meaning that the transaction would fail. Accordingly, a client endpoint logic of the first endpoint functions, in part, to place the transaction as received by from a local resource into a format that the second endpoint can recognize and process. Thus, each transaction initiated by the first endpoint must be reformatted (e.g., undergo opcode and address translation) by the client endpoint logic of the first endpoint so as to be recognizable by the second endpoint.

With reference to the method 1400, then, the formatted transaction is not recognizable by the remote endpoint in the sense that server endpoint logic 304*b* would not recognize the opcode and/or the address (e.g., memory address for a read or write operation) included in the formatted transaction if the server client endpoint logic 304*b* received the formatted transaction directly from the local resource 320*a*. Thus, the client endpoint logic 300*a* performs certain operations (e.g., opcode and address translation) that convert the transaction into a format that the server endpoint logic 304*b* can process (i.e., the reformatted transaction mentioned in operation 1420 is recognizable by the server endpoint logic 304*b*).

Operation 1408 includes determining a first transaction category, from among a plurality of transaction categories, of the formatted transaction based on content of the formatted transaction. The content of the formatted transaction may include a header of the formatted transaction. For example, the classifier 700 determines the first transaction category as one of the types of transactions described with reference to FIG. 4 based on a transaction header (i.e., the content) of the formatted transaction.

Operations 1412 and 1416 relate to a tagging scheme, such as the tagging scheme described above with reference to FIG. 11. In more detail, operation 1412 includes storing an initial tag of the formatted transaction to a memory, where the initial tag is unique within a domain that includes the first processing block (i.e., a mastering block that initiates a transaction). Operation 1416 includes replacing the initial tag with a new tag, where the new tag is unique within a domain that is between the first processing block (the components of the client endpoint logic egress path) and the remote endpoint. The new tag is transmitted with the reformatted transaction in operation 1436. The classifier 700 may store the initial tag to annotation space 704 and retrieve the new tag from annotation space 704 in accordance with the discussion of FIG. 7. In the example shown in FIG. 11, the initial tag may correspond to tag A while the new tag may correspond to tag B.

With reference to FIG. 11, it should be appreciated that operations 1404, 1408, and 1412 are performed within the master tag domain (of the client endpoint logic egress path of FIG. 7) while operation 1416 switches the domain from the master tag domain to the network tag domain (still in the client endpoint logic egress path of FIG. 7). Thus, operations 1420 to 1436 are performed within the network tag domain of FIG. 11.

Operation 1420 includes performing one or operations on the formatted transaction based on the first transaction category to form a reformatted transaction in a format that is recognizable by the remote endpoint. The one or more operations may comprise operations performed by the transaction parser 708 and/or the translator 712. For example, in at least one embodiment, the one or more operations includes the transaction parser 708 passing the formatted transaction through a state machine according to first configuration information that is selected based on the first transaction category determine in operation 1408 (see FIG. 13 for an example of first configuration information). The one or more operations may further include the translator 712 performing at least one translation operation for the formatted transaction based on output of the state machine and based on second configuration information to form the reformatted transaction. The at least one translation operation may include address and/or opcode translation to convert the formatted transaction into a reformatted transaction that is ready for transmission over a transmission interface to the remote endpoint (e.g., transmission from IB core 308*a* to IB core 308*b*). In view of the above, it may be said that operation 1420 determines a destination for the reformatted transaction and further determines a transmission schedule for transmitted the reformatted transaction to the remote endpoint.

Operation 1424 includes placing the reformatted transaction in a queue for transmission to the remote endpoint. For example, as shown in FIG. 7, the transaction header and data of reformatted transaction are split into separate queues. Operation 1424 may include placing the reformatted transaction in the proper output queue(s). Thereafter, the transaction is ready to send to the remote endpoint.

Operations 1428 and 1432 may correspond to optional operations of the method 1400 that may be performed when the reformatted transaction from operation 1424 is small enough to be combined with one or more other reformatted transactions. Operation 1428 may include aggregating the reformatted transaction with one or more other reformatted transactions destined for the remote endpoint to form an aggregated transaction while operation 1432 may include performing header compression on the aggregated transaction. Operations 1428 and 1432 may be carried out by the QP framer 716 in FIG. 7.

Operation 1436 includes transmitting the reformatted transaction from operation 1424 or the aggregated transaction from operation 1432 to the remote endpoint, for example, through the IB core interface 720 and the IB core 308*a*.

Figure 15:
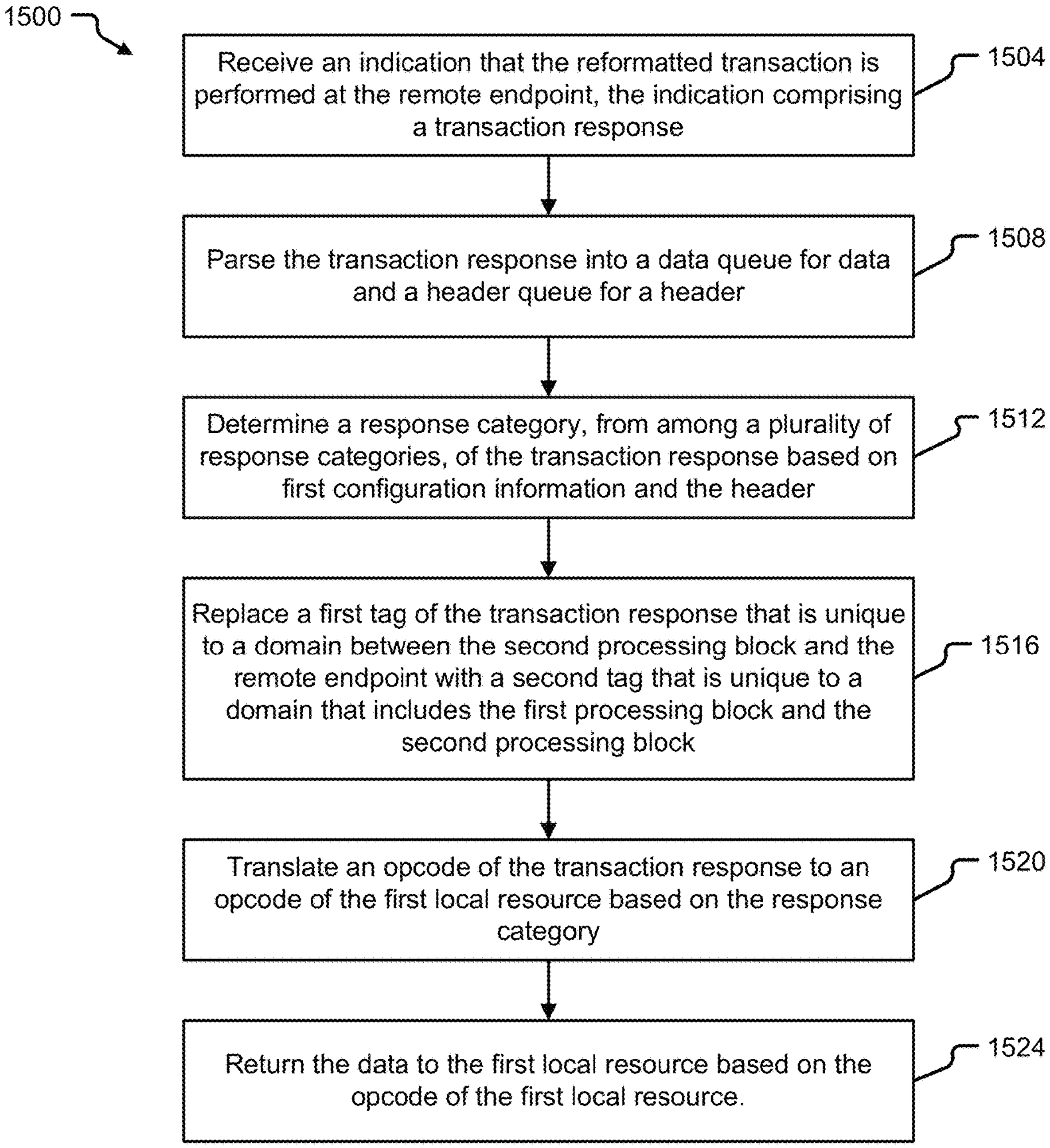
FIG. 15 illustrates a method for an ingress path of client endpoint logic according to at least one example embodiment.

FIG. 15 illustrates a method 1500 according to at least one example embodiment. The method 1500 may include operations carried out by a processing block of a client endpoint logic 300*a*, 300*b* in FIG. 3, for example, a second processing block that comprises components in the client endpoint logic ingress path as shown in FIG. 8. Accordingly, the method 1500 is described with reference to various elements from FIGS. 1-13. For the sake of explanation, the method 1500 is explained with reference to client endpoint logic 300*a*, but may also be applied to client endpoint logic 300*b*. The method 1500 may relate to the client endpoint logic 300*a* receiving a response from a remote endpoint regarding a completed transaction that originated from a local resource 320*a*. For example, when the reformatted transaction sent from client endpoint logic 300*a* to the remote endpoint in FIG. 14 is completed at the remote endpoint, the remote endpoint (server endpoint logic 304*b*) generates an indication that the reformatted transaction is complete (e.g., successfully implemented at the local resource 320*b*).

Operation 1504 includes receiving an indication that the reformatted transaction (from FIG. 14) is performed at the remote endpoint. In at least one embodiment, the indication comprises a transaction response that occurs when the reformatted transaction includes a read operation to read data from the remote endpoint. Such a transaction response may be issued to the client endpoint logic 300*a* and include data read from the local resource 320*b* of the remote endpoint. Notably, a transaction response may also be issued for a reformatted transaction that includes a store or write operation if needed. However, reformatted transactions that comprise store or write operations may be considered as posted writes, where the mastering entity assumes the store operation is completed by the subordinate entity without receiving a transaction response from the subordinate entity.

Operation 1508 includes parsing the transaction response into a data queue for data and a header queue for a header. For example, the QP parser 812 splits the transaction response into a transaction response header and data for a transaction response header queue and a data queue respectively.

Operation 1512 includes determining a response category, from among a plurality of response categories, of the transaction response based on first configuration information and the header. For example, classifier 816 consults first configuration information config to determine the category or type of transaction response as belonging to one of the transaction types discussed with reference to FIG. 4.

Operation 1516 includes replacing a first tag of the transaction response that is unique to a domain between the second processing block (i.e., the components in the ingress path of client endpoint logic 300*a*) and the remote endpoint with a second tag that is unique to a domain that includes the second processing block and the first processing block (i.e., the components in the egress path of client endpoint logic 300*a*). For example, with reference to FIGS. 8 and 11, the swapper 820 may consult the configuration information config and replace tag B of a received transaction response with tag A (where tag B replaced tag C within the egress path of the server endpoint logic 300*b* before the server endpoint logic 300*b* sent the transaction response to the ingress path of the client endpoint logic 300*a*).

As may be appreciated with reference to FIG. 11, operations 1504 to 1512 are performed within the network tag domain (of the client endpoint logic ingress path of FIG. 8) while operation 1516 switches the domain from the network tag domain to the master tag domain. Operations 1520 and 1524, then, are performed in the master tag domain (still in the client endpoint logic ingress path of FIG. 8).

Operation 1520 includes translating an opcode of the transaction response to an opcode of the first local resource 320*a* based on the response category from operation 1512. For example, the swapper 820 consults the configuration information config and swaps the opcode as initially received with the transaction response for an opcode that is recognizable by the first local resource 320*a*. Stated another way, operation 1520 places the transaction response into a format the is recognizable by the local resource 320*a*.

Operation 1524 includes returning the data to the first local resource 320*a*, for example, based on the opcode that is recognizable by the local resource 320*a*. As may be appreciated and with reference to FIG. 5, the first local resource 320*a* may correspond to a CPU of a network device while the data returned to the CPU may be read from a second local resource 320*a* that corresponds to memory MEM.

Figure 16:
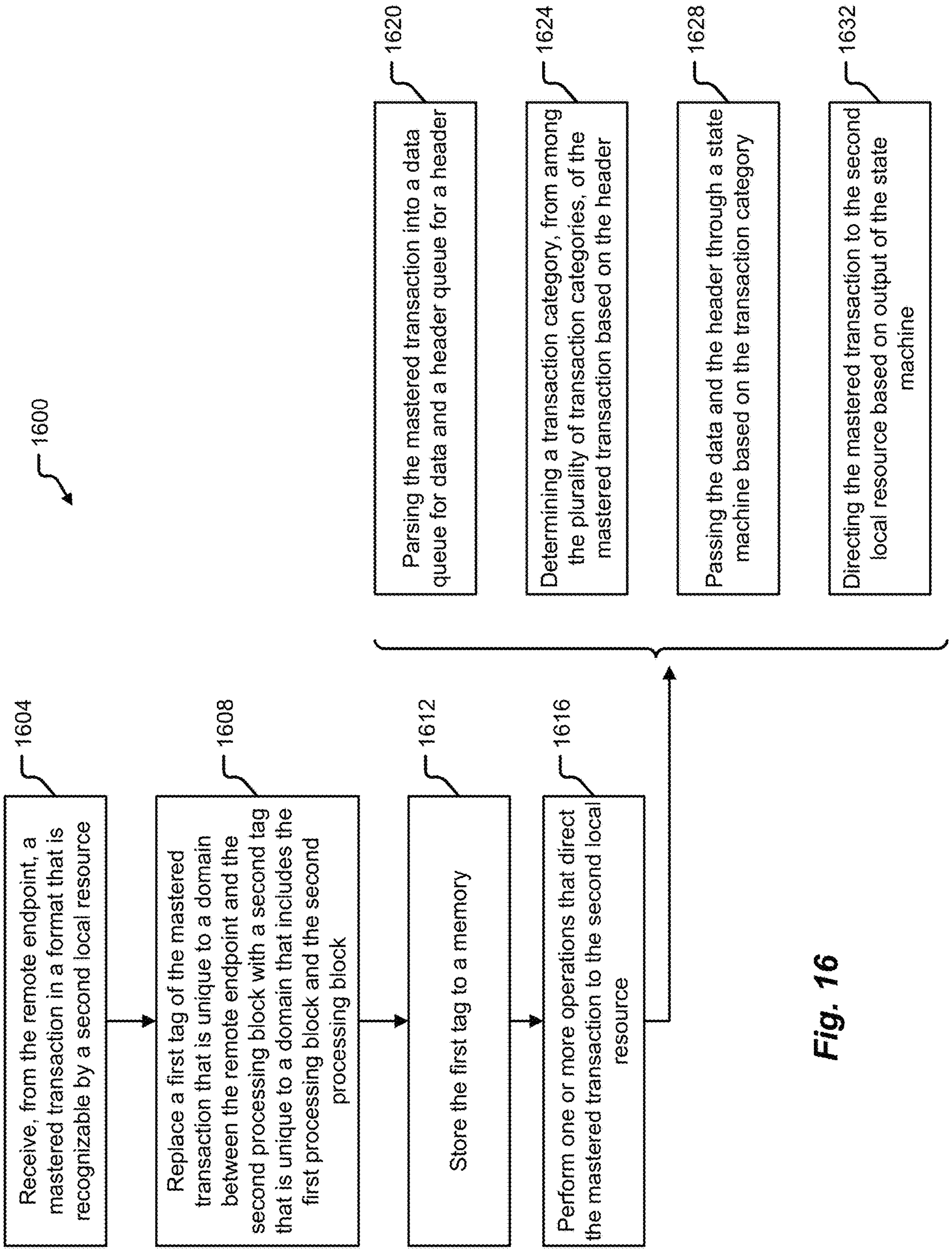
FIG. 16 illustrates a method for an ingress path of server endpoint logic according to at least one example embodiment.

FIG. 16 illustrates a method 1600 according to at least one example embodiment. The method 1600 may include operations carried out by a processing block of a server endpoint logic 304*a*, 304*b* in FIG. 3, for example, a second processing block that comprises components in the server endpoint logic ingress path as shown in FIG. 9. The second processing block in the discussion of FIG. 16 should not be confused with the second processing block mentioned in FIG. 15 as each relates to different parts of logic (client endpoint logic in FIG. 15, server endpoint logic in FIG. 16). The method 1600 is described with reference to various elements from FIGS. 1-13. For the sake of explanation, the method 1600 is explained with reference to server endpoint logic 304*a* receiving a mastered transaction from local resource 320*b* through client endpoint logic 300*b*, but may also be applied to server endpoint logic 304*b* receiving a mastered transaction from local resource 320*a* through client endpoint logic 300*a*.

Operation 1604 includes receiving, from the remote endpoint, a mastered transaction in a format that is recognizable by a second local resource. Here, the second local resource may correspond to a local resource 320*a*, such as a memory coupled to the server endpoint logic 304*a*, and the mastered transaction may include a read operation to read data from the memory as requested by, for example, a CPU within a local resource 320*b* of the remote endpoint. As used herein, a "mastered transaction" is a transaction, such as a read request or write request, initiated by one endpoint (the master endpoint) and sent to a remote endpoint (the subordinate endpoint) for completion. Thus, operation 1604 and the remaining operations of the method 1600 are described from the perspective of a subordinate endpoint that receives a mastered transaction from a master endpoint.

Operation 1608 includes replacing a first tag of the mastered transaction that is unique to a domain between the remote endpoint (e.g., egress path of client endpoint logic 300*b*) and the second processing block of FIG. 16 (e.g., components of ingress path of server endpoint logic 304*a*) with a second tag that is unique to a domain that includes the first processing block from FIG. 14 (e.g., components of egress path of client endpoint logic 300*a*) and the second processing block from FIG. 16 (components ingress path of server endpoint logic 304*a*). Operation 1612 includes storing the first tag to a memory. For example, transaction parser/tag swapper 920 performs operations 1608/1612 so that the second tag replaces the first tag while storing the first tag to annotation space 704. In accordance with tag swapping schemes described herein, the first tag may be patched back to a transaction response upon completion of the mastered transaction at the local resource 320*a*.

As may be appreciated with reference to FIG. 11, operations 1604 is performed within the network tag domain (of the server endpoint logic ingress path of FIG. 9) while operations 1608 and 1612 switch the domain from the network tag domain to the subordinate tag domain.

Operations 1616 to 1632, then, are performed in the subordinate tag domain (still in the server endpoint logic ingress path of FIG. 9).

Operation 1616 includes performing one or more operations that direct the mastered transaction to the second local resource 320*b*. FIG. 16 further illustrates operations 1620 to 1632 to describe the one or more operations that direct the mastered transaction to the second local resource 320*b*.

Operation 1620 includes parsing the mastered transaction into a data queue for data and a header queue for a header. For example, the QP parser 912 splits the mastered transaction into a transaction header and data as shown in FIG. 9.

Operation 1624 includes determining a transaction category, from among the plurality of transaction categories, of the mastered transaction based on the header. For example, the classifier 916 consults configuration information and the header to determine the type or category of transaction as one of those discussed with reference to FIG. 4.

Operation 1628 includes passing the data and the header through a state machine based on the transaction category from operation 1624. For example, the transaction parser/tag swapper 920 passes the data and the header through a state machine that is configured for the determined transaction category, where such state machine is configured according to configuration information of the transaction parser/tag swapper 920.

Figure 17:
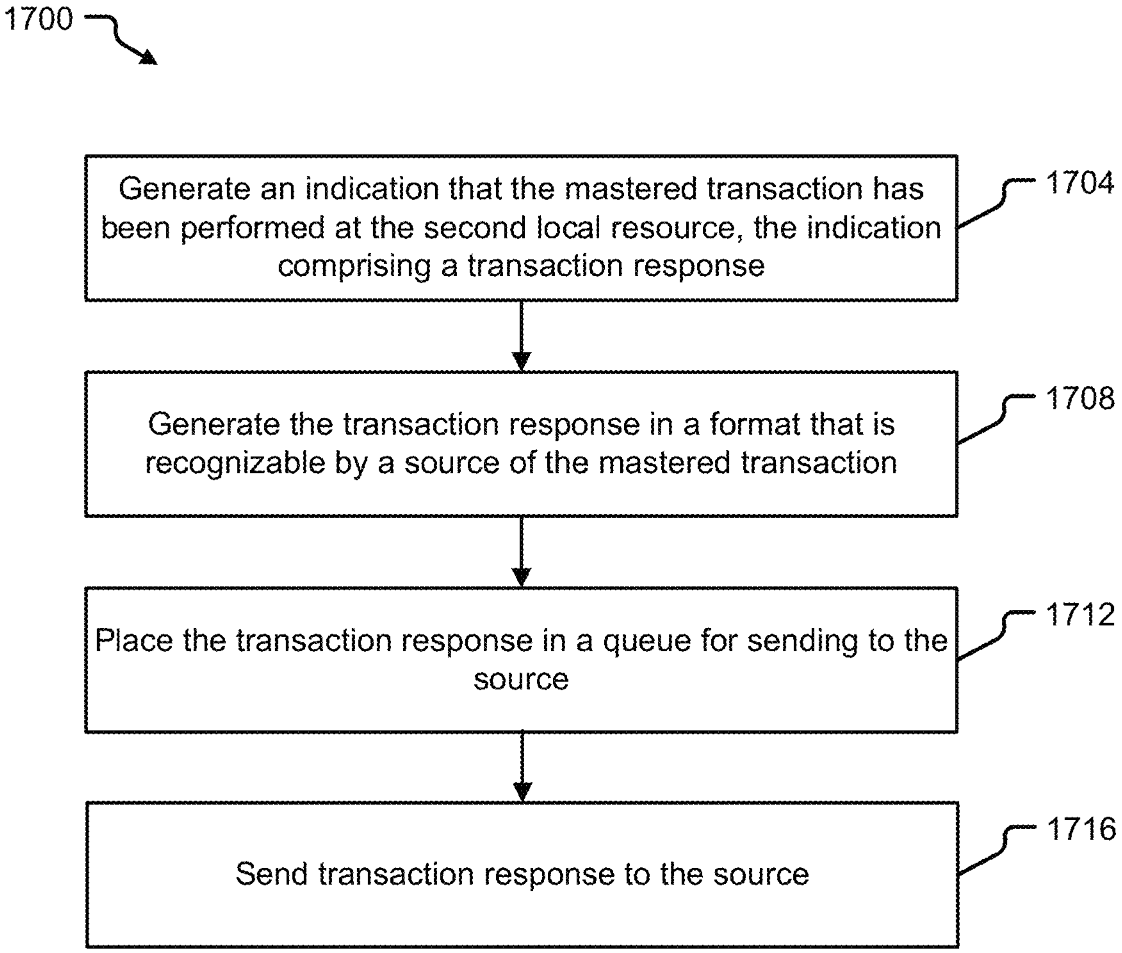
FIG. 17 illustrates a method for an egress path of server endpoint logic according to at least one example embodiment.

Operation 1632 includes directing the mastered transaction to the second local resource 320*a* based on output of the state machine. Thereafter, the second local resource 320*a* carries out the mastered transaction and may generate a transaction response for sending back to the remote endpoint through an egress path of the server endpoint logic 304*a*. FIG. 17 describes generation of a transaction response in more detail.

FIG. 17 illustrates a method 1700 according to at least one example embodiment. The method 1700 may include operations carried out by a processing block of a server endpoint logic 304*a*, 304*b* in FIG. 3, for example, a third processing block that comprises components in the server endpoint logic egress path as shown in FIG. 10. The method 1700 is described with reference to various elements from FIGS. 1-13. For the sake of explanation, the method 1700 is explained with reference to server endpoint logic 304*a* that has served a mastered transaction received from local resource 320*b* through client endpoint logic 300*b*, but may also be applied to server endpoint logic 304*b* that has served a mastered transaction received from local resource 320*a* through client endpoint logic 300*a*. Stated another way, the method 1700 relates to the server endpoint logic 304*a* generating a transaction response upon completion of a mastered transaction from a remote endpoint at a local resource 320*a* (i.e., the same mastered transaction discussed with reference to FIG. 16).

Operation 1704 includes generating an indication that the mastered transaction has been performed at the second local resource 320*a*. In at least one embodiment, the indication comprises a transaction response, for example, when the mastered transaction comprises a read operation to read data from the second local resource 320*a*. However, a transaction response may also be generated when the mastered transaction comprises a store operation, if needed. In at least one other embodiment, the indication comprises a posted operation or posted write, for example, when the mastered transaction comprises a store or write operation.

Operation 1708 includes generating the transaction response in a format that is recognizable by a source of the mastered transaction while operation 1712 includes placing the transaction response in a queue for sending to the source. In this case, the source of the mastered transaction may comprise a local resource 320*b*, which may correspond to a CPU that wants to retrieve data from second local resource 320*a* corresponding to memory. As may be appreciated, the method 1700 is carried out by various components of the egress path of the server endpoint logic 304*a* shown in FIG. 10. In operation 1716, the transaction response is sent to the source (i.e., the initiator of the mastered transaction).

Here, it should be appreciated that operation 1708 may include a tag swapping operation that changes the domain of the transaction response from the subordinate tag domain to the network tag domain for transmission of the transaction response to the remote endpoint. With reference to FIG. 11, then, operation 1704 is performed within the subordinate tag domain (of the server endpoint logic egress path of FIG. 10) while operation 1708 includes a tag swap to switch the domain from the subordinate tag domain to the network tag domain (still in the server endpoint logic egress path of FIG. 10). Thereafter, operations 1712 and 1716 are performed in the network tag domain.

Figure 18:
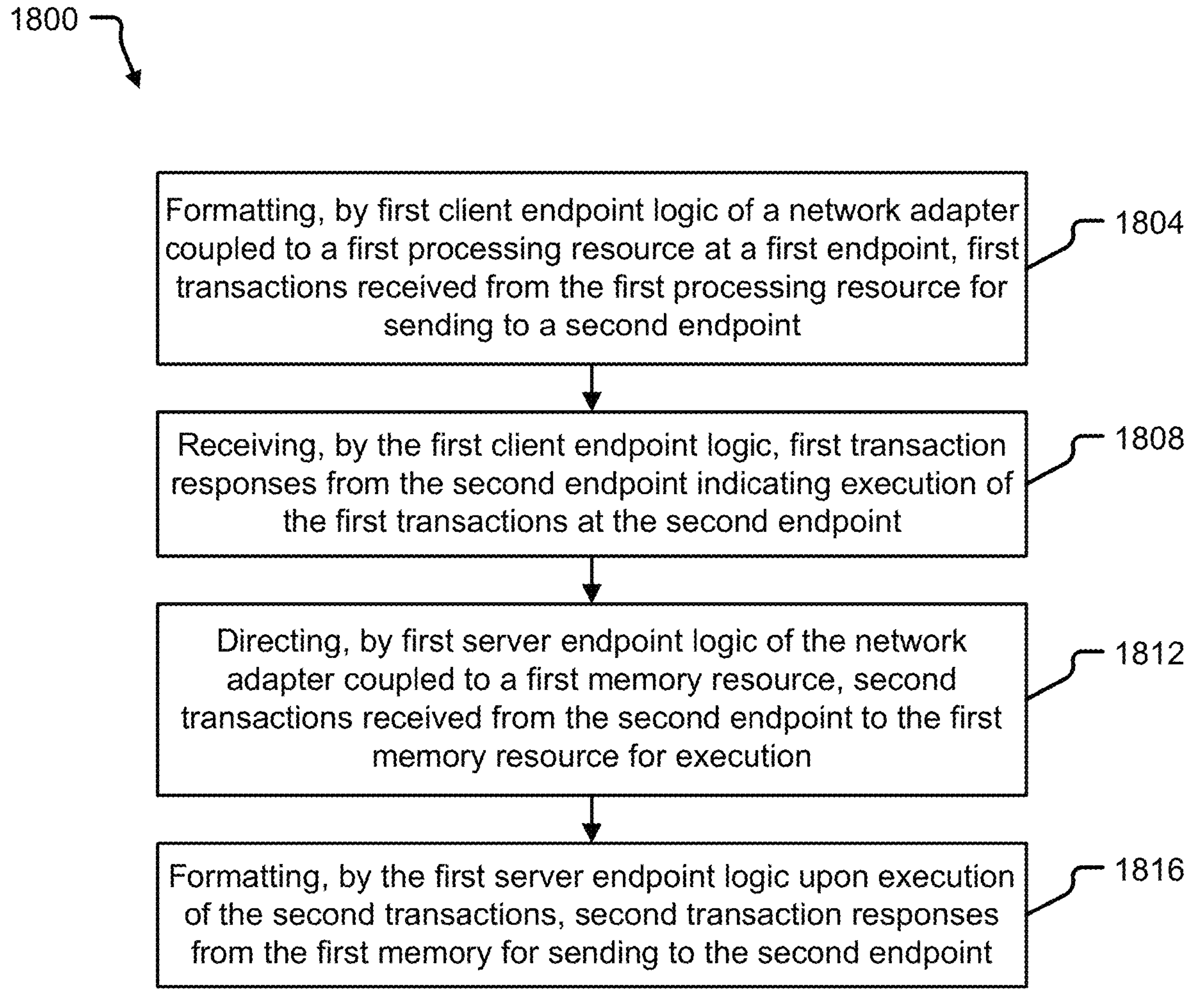
FIG. 18 illustrates a generalized method for client and server endpoint logic according to at least one example embodiment.

FIG. 18 illustrates a method 1800 according to at least one example embodiment. The method 1800 described an abridged method for client and server endpoint logic of one or both of the DPUs 1 and 2. The method 1800 is described with reference to client endpoint logic 300*a* sending first (mastered) transactions to server endpoint logic 304*b* and receiving first transaction response from server endpoint logic 304*b*, and to server endpoint logic 304*a* directing second (mastered) transactions received from client endpoint logic 300*b* and generating second transaction responses for sending to client endpoint logic 300*b*. However, the method 1800 may be equally applied to client endpoint logic 300*b* and server endpoint logic 304*b*.

Operation 1804 includes formatting, by first client endpoint logic 300*a* of a network adapter coupled to a first processing resource at a first endpoint, first transactions received from the first processing resource for sending to a second endpoint. Here, the network adapter may correspond to DPU 1 or to a device that includes DPU 1, the first processing resource may correspond to a CPU or other processing entity within local resources 320*a*, the second endpoint may correspond to one or more local resources 320*b* coupled to DPU 2 (e.g., memory, CPU, etc.), and the first transactions may correspond to mastered transactions that include read and/or write operations destined for a memory of local resources 320*b*. Operation 1804 may be carried out by components in an egress path of the first client endpoint logic 300*a*.

Operation 1808 includes receiving, by the first client endpoint logic 300*a* (e.g., via an ingress path thereof), first transaction responses from the second endpoint indicating execution of the first transactions at the second endpoint. Operation 1808 may occur after the first transactions are carried out at the local resource 320*b*. The first transaction responses may be generated by an egress path of server endpoint logic 304*b* at DPU 2.

Operation 1812 includes directing, by first server endpoint logic 304*a* of the network adapter coupled to a first memory resource, second transactions received from the second endpoint to the first memory resource for execution. Here, the first memory resource may correspond to memory coupled to the first server endpoint logic 304*a* while the second transactions may correspond to mastered transactions (read and/or write operations) from the client endpoint logic 300*b* of DPU 2. Operation 1812 may be carried out by components in the ingress path of the first server endpoint logic 304*a*.

Operation 1816 includes formatting, by the first server endpoint logic 304*a* upon execution of the second transactions, second transaction responses from the first memory resource for sending to the second endpoint. Here, the second transaction responses may be generated by an egress path of the first server endpoint logic 304*a* upon successful completion of the corresponding second transactions from operation 1812. As such, the second transaction responses may each have a corresponding second transaction that was directed to the first memory resource in operation 1812. Thereafter, the second transaction response are sent to the second endpoint.

In view of the above, it should be appreciated that at least one embodiment is directed to a system that includes a first endpoint (DPU 1) comprising first client endpoint logic 300*a* coupled to a first processing resource (e.g., a CPU) in resources 320*a*. The first client endpoint logic 300*a* is configured to format first transactions received from the first processing resource 320*a* for sending to a second endpoint (e.g., a DPU 2 coupled to memory in resources 320*b*). The first client endpoint logic 300*a* is configured to receive first transaction responses from the second endpoint indicating execution of the first transactions at the second endpoint. The system may further include first server endpoint logic 304*a* coupled to a first memory resource (e.g., a memory) in resources 320*a*. The first server endpoint logic 304*a* is configured to direct second transactions received from the second endpoint (e.g., a CPU of resources 320*b*) to the first memory resource for execution, and to, upon execution of the second transactions, format second transaction responses from the first memory resource for sending to the second endpoint.

The system may further comprise the second endpoint, where the second endpoint includes second server endpoint logic 304*b* coupled to a second memory resource (e.g., memory in resources 320*b*). The second server endpoint logic 304*b* is configured to direct the first transactions received from the first client endpoint logic 300*a* to the second memory resource for execution, and to, upon execution of the first transactions, format the first transaction responses for sending to the first client endpoint logic 300*a*. The second endpoint may further include second client logic 300*b* configured to format the second transactions for sending to the first server endpoint logic 304*a*, and to receive the second transaction responses from the first server endpoint logic 304*a* indicating execution of the second transactions at the first memory resource (a memory in resources 320*a*).

As may be appreciated, the above described functions of the first and second client endpoint logic 300*a*, 300*b* and the first and second server endpoint logic 304*a*, 304*b* are generalized descriptions of the egress and ingress paths of each client endpoint logic 300*a*, 300*b* and each server endpoint logic 304*a*, 304*b*.

Figure 19:
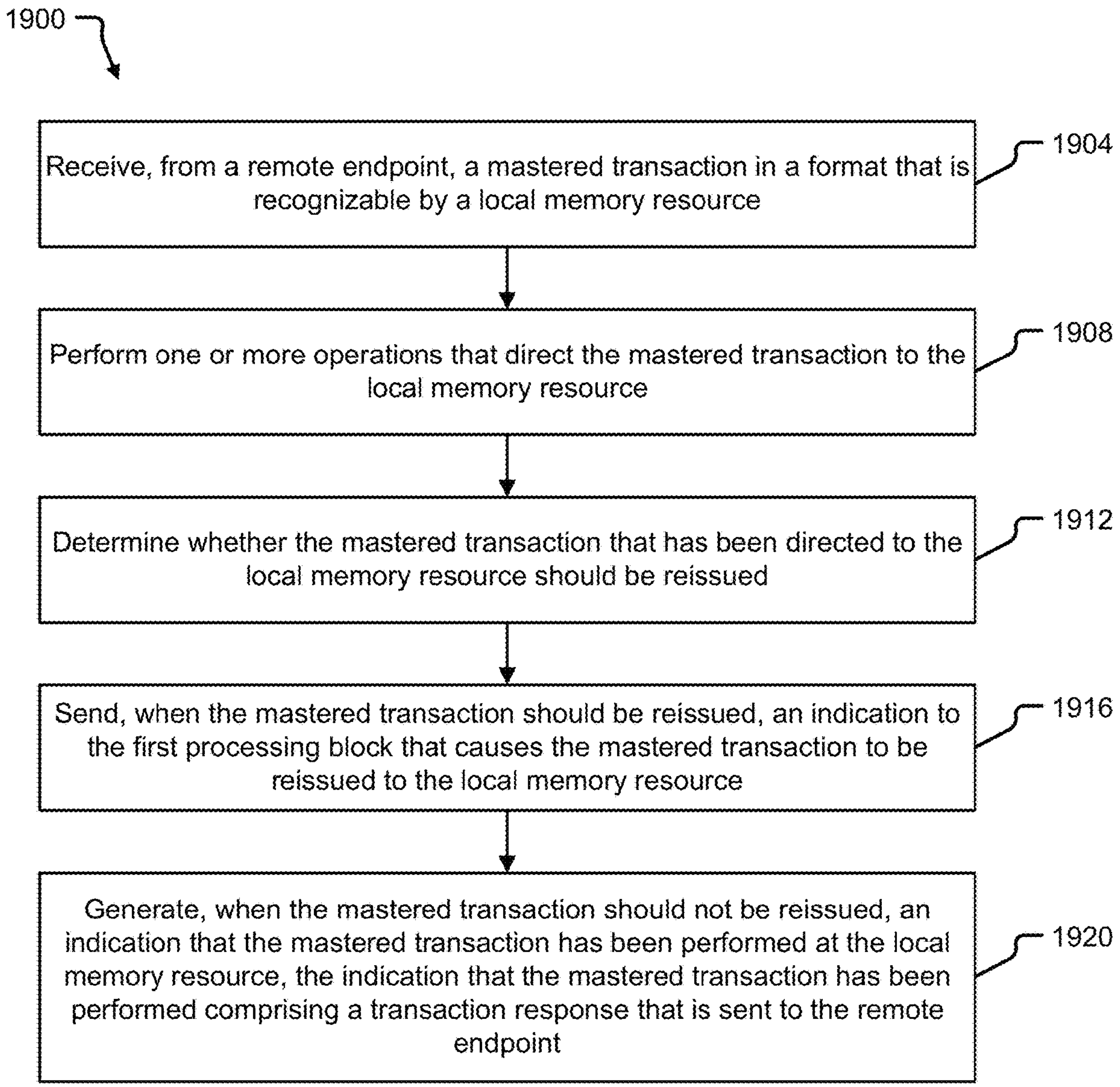
FIG. 19 illustrates a generalized for method server endpoint logic according to at least one example embodiment.

FIG. 19 illustrates a method 1900 according to at least one example embodiment. The method 1900 is described with reference to various elements in FIGS. 1-18, and the method 1900 may relate to operations performed by a server endpoint logic 304*a*, 304*b*. The method 1900 is described with reference to server endpoint logic 304*a*, but may also be applied to server endpoint logic 304*b*.

Operation 1904 includes receiving, from a remote endpoint, a mastered transaction in a format that is recognizable by a local memory resource. Operation 1908 includes performing one or more operations that direct the mastered transaction to the local memory resource. Operations 1904 and 1908 may be performed by a first processing block that corresponds to components in an ingress path of the server endpoint logic 304*a* as shown in FIG. 9. In that case, the remote endpoint corresponds to DPU 2 or to a resource 320*b* coupled to DPU 2 so that the mastered transaction is one sent by client endpoint logic 300*b* of DPU 2. The local memory resource may correspond to a memory within local resources 320*a* coupled to DPU 1. The one or more operations in operation 1908 may comprise the same or similar operations as 1608 to 1632 from FIG. 16.

Operations 1912 to 1920 may correspond to operations performed by a second processing block that corresponds to components within the egress path of the server endpoint logic 304*a* as shown in FIG. 10. Operation 1912 includes determining whether the mastered transaction that has been directed to the local memory resource should be reissued. Operation 1916 includes sending, when the mastered transaction should be reissued, an indication to the first processing block (or the egress path of server endpoint logic 304*a*) that causes the mastered transaction to be reissued to the local memory resource. Operations 1912 and 1916 may be performed by the transaction response parser 1008 in FIG. 10. Meanwhile, operation 1920 includes generating, when the mastered transaction should not be reissued, an indication that the mastered transaction has been performed at the local memory resource. Here, the indication that the mastered transaction has been performed may comprise a transaction response that is sent to the remote endpoint (DPU 2). In accordance with the components of the egress path of the server endpoint logic 304*a*, the transaction response may be generated in a format that is recognizable by the remote endpoint, and then placed in a queue for sending to the remote endpoint.

With reference to FIG. 11, operation 1904 occurs within the network tag domain (of an ingress path of the server endpoint logic 304*a*) while operation 1908 includes a tag swapping operation to switch the tag domain from the network tag domain to the subordinate tag domain. Thereafter, operations 1912 to 1920 are performed in the subordinate tag domain (still in an ingress path of the server endpoint logic 304*a*).

More specifically, in accordance with tagging schemes described herein, the method 1900 may replace a first tag of the mastered transaction that is unique to a domain between the first processing block (ingress path of server endpoint logic 304*a*) and the remote endpoint (DPU 2) with a second tag that is unique to a domain that includes the first processing block and the second processing block (egress path of server endpoint logic 304*a*). As described with reference to other figures, the method may store the first tag to a memory (e.g., to annotation space 904). Thereafter, the second processing block may retrieve the first tag from the memory when the indication that the mastered transaction has been performed at the local memory resource comprises the transaction response, and then send the transaction response with the first tag to the remote endpoint (DPU 2).

Inventive concepts relate to software-defined enablement which provides flexible hardware configurations at runtime. However, fixed hardware configurations that leverage the same or similar datapath functionalities may also be provided. For example, egress and/or ingress paths may exist for each different type of interconnect architecture, which may reduce or eliminate reliance on software to provide the proper configuration.

In view of the above, it should be appreciated that example embodiments provide systems, methods, and devices for enabling a DPU or similar device to establish hardware tunnels for system interconnect traffic that is useful for memory disaggregation, which effectively enables a locally attached host to access remotely located memories regardless of the type of host.

Any of the steps, functions, and operations discussed herein can be performed continuously and/or automatically.

The exemplary systems and methods of this disclosure have been described in relation to communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

While flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, disclosed methods may be readily implemented in conjunction with software using object or object-oriented software development environments that provide portable source code that can be used on a variety of computer or workstation platforms. Alternatively, disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure.

It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation, or technique.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Methods described or claimed herein can be performed with traditional executable instruction sets that are finite and operate on a fixed set of inputs to provide one or more defined outputs. Alternatively, or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment. Embodiments may be configured as follows:

(1) A system, comprising:
- a first processing block configured to:
  - receive, from a first local resource, a formatted transaction in a format that is not recognizable by a remote endpoint;
  - determine a first transaction category, from among a plurality of transaction categories, of the formatted transaction based on content of the formatted transaction;
  - perform one or operations on the formatted transaction based on the first transaction category to form a reformatted transaction in a format that is recognizable by the remote endpoint; and
  - place the reformatted transaction in a queue for transmission to the remote endpoint.

(2) The system of (1), further comprising:
- a transmission interface that transmits the reformatted transaction to the remote endpoint.

(3) The system of one or more of (1) to (2), wherein the transmission interface corresponds to an InfiniBand interface.

(4) The system of one or more of (1) to (3), wherein the first processing block is configured to:
- store an initial tag of the formatted transaction to a memory, the initial tag being unique within a domain that includes the first processing block; and
- replace the initial tag with a new tag, the new tag being transmitted with the reformatted transaction and being unique within a domain that is between the first processing block and the remote endpoint.

(5) The system of one or more of (1) to (4), wherein the content of the formatted transaction includes a header of the formatted transaction.

(6) The system of one or more of (1) to (5), wherein the one or more operations that form the reformatted transaction includes:
- passing the formatted transaction through a state machine according to first configuration information that is selected based on the first transaction category; and
- performing at least one translation operation for the formatted transaction based on output of the state machine and based on second configuration information to form the reformatted transaction.

(7) The system of one or more of (1) to (6), wherein the at least one translation operation includes translating an address and an opcode of the formatted transaction.

(8) The system of one or more of (1) to (7), wherein, for the reformatted transaction in the queue, the first processing block is configured to:
- aggregate the reformatted transaction with one or more other reformatted transactions destined for the remote endpoint to form an aggregated transaction; and
- perform header compression on the aggregated transaction.

(9) The system of one or more of (1) to (8), further comprising:
- a second processing block configured to:
  - receive an indication that the reformatted transaction is performed at the remote endpoint.

(10) The system of one or more of (1) to (9), wherein the indication comprises a transaction response, and wherein the second processing block is configured to:
- parse the transaction response into a data queue for data and a header queue for a header;
- determine a response category, from among a plurality of response categories, of the transaction response based on first configuration information and the header; and
- replace a first tag of the transaction response that is unique to a domain between the second processing block and the remote endpoint with a second tag that is unique to a domain that includes the first processing block and the second processing block.

(11) The system of one or more of (1) to (10), wherein the second processing block is configured to:
- translate an opcode of the transaction response to an opcode of the first local resource based on the response category; and
- return the data to the first local resource based on the opcode of the first local resource.

(12) The system of one or more of (1) to (11), wherein the first local resource corresponds to a CPU of a network device.

(13) The system of one or more of (1) to (12), further comprising:
- a second processing block configured to:
  - receive, from the remote endpoint, a mastered transaction in a format that is recognizable by a second local resource; and
  - perform one or more operations that direct the mastered transaction to the second local resource.

(14) The system of one or more of (1) to (13), wherein the one or more operations that direct the mastered transaction to the second local resource include:
- parsing the mastered transaction into a data queue for data and a header queue for a header;
- determining a second transaction category, from among the plurality of transaction categories, of the mastered transaction based on the header;
- passing the data and the header through a state machine based on the second transaction category; and directing the mastered transaction to the second local resource based on output of the state machine.

(15) The system of one or more of (1) to (14), wherein the second processing block is configured to:
- replace a first tag of the mastered transaction that is unique to a domain between the remote endpoint and the second processing block with a second tag that is unique to a domain that includes the first processing block and the second processing block; and
- store the first tag to a memory.

(16) The system of one or more of (1) to (15), further comprising:

a third processing block configured to:

generate an indication that the mastered transaction has been performed at the second local resource, the indication comprising a transaction response.

(17) The system of one or more of (1) to (16), wherein the third processing block is configured to:

generate the transaction response in a format that is recognizable by a source of the mastered transaction; and place the transaction response in a queue for sending to the source.

(18) A system, comprising:

a first endpoint comprising:

first client endpoint logic coupled to a first processing resource, the first client endpoint logic being configured to format first transactions received from the first processing resource for sending to a second endpoint, and to receive first transaction responses from the second endpoint indicating execution of the first transactions at the second endpoint; and first server endpoint logic coupled to a first memory resource, the first server endpoint logic being configured to direct second transactions received from the second endpoint to the first memory resource for execution, and to, upon execution of the second transactions, format second transaction responses from the first memory resource for sending to the second endpoint.

(19) The system of (18), further comprising:

the second endpoint comprising:

second server endpoint logic coupled to a second memory resource, the second server endpoint logic being configured to direct the first transactions received from the first client endpoint logic to the second memory resource for execution, and to, upon execution of the first transactions, format the first transaction responses for sending to the first client endpoint logic; and second client endpoint logic configured to format the second transactions for sending to the first server endpoint logic, and to receive the second transaction responses from the first server endpoint logic indicating execution of the second transactions at the first memory resource.

(20) A method, comprising:

formatting, by first client endpoint logic of a network adapter coupled to a first processing resource at a first endpoint, first transactions received from the first processing resource for sending to a second endpoint;

receiving, by the first client endpoint logic, first transaction responses from the second endpoint indicating execution of the first transactions at the second endpoint;

directing, by first server endpoint logic of the network adapter coupled to a first memory resource, second transactions received from the second endpoint to the first memory resource for execution; and formatting, by the first server endpoint logic upon execution of the second transactions, second transaction responses from the first memory resource for sending to the second endpoint.

(21) A system, comprising:

a first processing block configured to:

receive, from a remote endpoint, a mastered transaction in a format that is recognizable by a local memory resource; and perform one or more operations that direct the mastered transaction to the local memory resource; and a second processing block configured to:

determine whether the mastered transaction that has been directed to the local memory resource should be reissued;

send, when the mastered transaction should be reissued, an indication to the first processing block that causes the mastered transaction to be reissued to the local memory resource; and generate, when the mastered transaction should not be reissued, an indication that the mastered transaction has been performed at the local memory resource, the indication that the mastered transaction has been performed comprising a transaction response that is sent to the remote endpoint.

(22) The system of (21), wherein the second processing block is configured to:

generate the transaction response in a format that is recognizable by the remote endpoint; and place the transaction response in a queue for sending to the remote endpoint.

(23) The system of one or more of (21) to (22), wherein the one or more operations that direct the mastered transaction to the local memory resource include:

parsing the mastered transaction into a data queue for data and a header queue for a header;

determining a transaction category, from among a plurality of transaction categories, of the mastered transaction based on the header;

passing the data and the header through a state machine based on the transaction category; and directing the mastered transaction to the local memory resource based on output of the state machine.

(24) The system of one or more of (21) to (23), wherein the first processing block is configured to:

replace a first tag of the mastered transaction that is unique to a domain between the first processing block and the remote endpoint with a second tag that is unique to a domain that includes the first processing block and the second processing block; and store the first tag to a memory.

(25) The system of one or more of (21) to (24), wherein the second processing block is configured to:

retrieve the first tag from the memory when the indication that the mastered transaction has been performed at the local memory resource comprises the transaction response; and send the transaction response with the first tag to the remote endpoint.

What is claimed is:

1. A system, comprising:

a first endpoint comprising:

first client endpoint logic coupled to a first processing resource, the first client endpoint logic to:

format first transactions received from the first processing resource for sending to a second endpoint, wherein formatting one of the first transactions includes replacing an initial tag of the first transaction with a new tag that is transmitted with the first transaction to the second endpoint, wherein the initial tag is unique from other tags within a first domain that includes the first endpoint, and wherein the new tag is unique from other tags within a second domain that is between the first endpoint and the second endpoint; and receive first transaction responses from the second endpoint indicating execution of the first transactions at the second endpoint; and first server endpoint logic coupled to a first memory resource, the first server endpoint logic to:

direct second transactions received from the second endpoint to the first memory resource for execution; and upon execution of the second transactions, format second transaction responses from the first memory resource for sending to the second endpoint.

2. The system of claim 1, further comprising:

the second endpoint comprising:

second server endpoint logic coupled to a second memory resource, the second server endpoint logic to direct the first transactions received from the first client endpoint logic to the second memory resource for execution, and to, upon execution of the first transactions, format the first transaction responses for sending to the first client endpoint logic; and second client endpoint logic to format the second transactions for sending to the first server endpoint logic, and to receive the second transaction responses from the first server endpoint logic indicating execution of the second transactions at the first memory resource.

3. The system of claim 1, further comprising:

a transmission interface to transmit the first transactions to the second endpoint and to receive the second transactions from the second endpoint.

4. The system of claim 3, wherein the transmission interface comprises an Infiniband interface.

5. The system of claim 1, wherein the second transactions comprise a request from the second endpoint to read from or write to the first memory resource.

6. The system of claim 1, wherein the first transactions comprise a request from the first endpoint to read from or write to a second memory resource of the second endpoint.

7. The system of claim 1, further comprising:

a network of switches to route the first transactions from the first endpoint to the second endpoint and the second transactions from the second endpoint to the first endpoint.

8. A method, comprising:

formatting, by first client endpoint logic of a network adapter coupled to a first processing resource at a first endpoint, first transactions received from the first processing resource for sending to a second endpoint, wherein formatting one of the first transactions includes replacing an initial tag of the first transaction with a new tag that is transmitted with the first transaction to the second endpoint, wherein the initial tag is unique from other tags within a first domain that includes the first endpoint, and wherein the new tag is unique from other tags within a second domain that is between the first endpoint and the second endpoint;

receiving, by the first client endpoint logic, first transaction responses from the second endpoint indicating execution of the first transactions at the second endpoint;

directing, by first server endpoint logic of the network adapter coupled to a first memory resource, second transactions received from the second endpoint to the first memory resource for execution; and formatting, by the first server endpoint logic upon execution of the second transactions, second transaction responses from the first memory resource for sending to the second endpoint.

9. The method of claim 8, wherein the second transactions comprise a request from the second endpoint to read from or write to the first memory resource.

10. The method of claim 8, wherein the first transactions comprise a request from the first endpoint to read from or write to a second memory resource of the second endpoint.

11. A system, comprising:

a first processing block to:

receive, from a remote endpoint, a mastered transaction in a format that is recognizable by a local memory resource; and perform one or more operations that direct the mastered transaction to the local memory resource, the one or more operations including;

replacing a first tag of the mastered transaction with a second tag that is transmitted with the mastered transaction to the local memory resource, wherein the first tag is unique from other tags within a first domain that is between the first processing block and the remote endpoint, and wherein the second tag is unique from other tags within a second domain that includes the first processing block; and a second processing block to:

determine whether the mastered transaction that has been directed to the local memory resource should be reissued;

send, when the mastered transaction should be reissued, an indication to the first processing block that causes the mastered transaction to be reissued to the local memory resource; and generate, when the mastered transaction should not be reissued, an indication that the mastered transaction has been performed at the local memory resource, the indication that the mastered transaction has been performed comprising a transaction response that is sent to the remote endpoint.

12. The system of claim 11, wherein the second processing block is to:

generate the transaction response in a format that is recognizable by the remote endpoint; and place the transaction response in a queue for sending to the remote endpoint.

13. The system of claim 11, wherein the one or more operations that direct the mastered transaction to the local memory resource include:

parsing the mastered transaction into a data queue for data and a header queue for a header;

determining a transaction category, from among a plurality of transaction categories, of the mastered transaction based on the header;

passing the data and the header through a state machine based on the transaction category; and directing the mastered transaction to the local memory resource based on output of the state machine.

14. The system of claim 11, wherein the first processing block is to:

store the first tag to a memory.

15. The system of claim 14, wherein the second processing block is to:

retrieve the first tag from the memory when the indication that the mastered transaction has been performed at the local memory resource comprises the transaction response; and send the transaction response with the first tag to the remote endpoint.

16. The system of claim 11, further comprising:

a transmission interface to receive the mastered transaction from the remote endpoint and to send the transaction response to the remote endpoint.

17. The system of claim 16, wherein the transmission interface comprises an Infiniband interface.

18. The system of claim 11, wherein the mastered transaction comprises a request from the remote endpoint to read from the local memory resource.

19. The system of claim 11, wherein the mastered transaction comprises a request from the remote endpoint to write to the local memory resource.

20. The system of claim 11, further comprising:

a network of switches to route the mastered transaction from the remote endpoint to the first processing block and to route the transaction response from the second processing block to the remote endpoint.

* * * * *